(12) United States Patent
Scherpbier et al.

(10) Patent No.: US 12,274,977 B1
(45) Date of Patent: Apr. 15, 2025

(54) CARBON DIOXIDE REMOVAL SYSTEMS USING A GEOTHERMAL HEAT SOURCE

(71) Applicant: AirMyne, Inc., Berkeley, CA (US)

(72) Inventors: Bart Ludo Scherpbier, San Francisco, CA (US); Cyndia Aiyun Cao, Oakland, CA (US); Mark Patrick Cyffka, El Cerrito, CA (US); Valerie Ann Wilson, Front Royal, VA (US); Sudip Mukhopadhyay, Berkeley, CA (US)

(73) Assignee: AirMyne, Inc., Berkeley, CA (US)

( * ) Notice: Subject to any disclaimer, the term of this patent is extended or adjusted under 35 U.S.C. 154(b) by 0 days.

(21) Appl. No.: 18/731,090

(22) Filed: May 31, 2024

Related U.S. Application Data

(60) Provisional application No. 63/565,601, filed on Mar. 15, 2024.

(51) Int. Cl.
*B01D 53/14* (2006.01)
*B01D 9/02* (2006.01)
*F24T 50/00* (2018.01)

(52) U.S. Cl.
CPC .......... *B01D 53/1475* (2013.01); *B01D 9/02* (2013.01); *B01D 53/1425* (2013.01);
(Continued)

(58) Field of Classification Search
None
See application file for complete search history.

(56) References Cited

U.S. PATENT DOCUMENTS 4,357,801 A * 11/1982 Wahl, III .......... B01D 53/1475
60/646
9,757,682 B2  9/2017 Endo et al.
(Continued)

FOREIGN PATENT DOCUMENTS

AU  2012321057 A1 * 5/2014 ............. B01D 53/62
CN  112212530 A * 1/2021
(Continued)

OTHER PUBLICATIONS

"Ohio research proposes coupling geothermal with direct aircarbon capture", ThinkGeoEnergy—Geothermal Energy News, Ohio research proposes coupling geothermal with direct air carbon capture (thinkgeoenergy.com), Feb. 2024, 5 pages.
(Continued)

*Primary Examiner* — Brit E. Anbacht
(74) *Attorney, Agent, or Firm* — Henry Patent Law Firm PLLC

(57) ABSTRACT

In a general aspect, a carbon dioxide ($CO_2$) removal system uses geothermal energy. In some implementations, a method to remove $CO_2$ gas from a gaseous feed includes directing a gaseous feed to interact with an alkaline capture solution in a first gas-liquid contactor. A first portion of $CO_2$ from the gaseous feed dissolves into the alkaline capture solution to form a $CO_2$-rich alkaline capture solution. Steam is generated using heat from a geothermal heat source, and the steam heats the $CO_2$-rich alkaline capture solution in a second gas-liquid contactor. A second portion of the $CO_2$ is separated from the $CO_2$-rich alkaline capture solution in the second gas-liquid contactor to form a $CO_2$-lean alkaline capture solution. The $CO_2$-lean alkaline capture solution is directed to the first gas-liquid contactor.

12 Claims, 10 Drawing Sheets

(52) U.S. Cl.
CPC .......... *F24T 50/00* (2018.05); *B01D 2252/50* (2013.01); *B01D 2257/504* (2013.01)

(56) References Cited

U.S. PATENT DOCUMENTS

| | | | |
|---|---|---|---|
| 11,612,853 B1 | 3/2023 | Mukhopadhyay et al. | |
| 11,644,220 B1 | 5/2023 | Marsh | |
| 11,801,476 B2 | 10/2023 | Scherpbier et al. | |
| 11,906,227 B2 | 2/2024 | Legg et al. | |
| 11,927,177 B2 | 3/2024 | Marsh et al. | |
| 12,005,390 B1* | 6/2024 | Scherpbier | B01D 53/1475 |
| 12,017,179 B1 | 6/2024 | Scherpbier et al. | |
| 2006/0185985 A1* | 8/2006 | Jones | C01D 7/14 423/220 |
| 2011/0277670 A1* | 11/2011 | Self | B01D 61/002 210/768 |
| 2012/0211421 A1* | 8/2012 | Self | B01D 53/80 210/205 |
| 2014/0369913 A1* | 12/2014 | Nakamura | B01D 53/62 423/220 |
| 2015/0005564 A1* | 1/2015 | Tanna | B01D 53/1406 96/242 |
| 2015/0251129 A1* | 9/2015 | Heirman | B01D 53/80 95/190 |
| 2016/0001223 A1* | 1/2016 | Okuno | F23J 15/04 422/168 |
| 2016/0200592 A1* | 7/2016 | Barnes | C02F 1/20 422/630 |
| 2016/0361682 A1* | 12/2016 | Yukumoto | B01D 53/1475 |
| 2018/0001254 A1* | 1/2018 | Fujita | B01D 53/1412 |
| 2021/0245092 A1* | 8/2021 | Liu | C01B 32/50 |
| 2022/0324785 A1* | 10/2022 | Goetheer | B01D 53/1493 |
| 2022/0355245 A1* | 11/2022 | Goetheer | C07C 51/412 |
| 2023/0046041 A1* | 2/2023 | Spjeld | B01D 5/0003 |
| 2023/0102252 A1 | 3/2023 | Jewett et al. | |
| 2023/0400226 A1* | 12/2023 | Romig | F24T 10/15 |
| 2024/0157285 A1* | 5/2024 | Liu | B01D 53/1425 |

FOREIGN PATENT DOCUMENTS

| | | | | |
|---|---|---|---|---|
| CN | 116832593 A | * | 10/2023 | |
| CN | 117959872 A | * | 5/2024 | |
| CN | 116020239 B | * | 6/2024 | |
| EP | 2537575 A1 | * | 12/2012 | ......... B01D 53/1475 |
| EP | 4107446 | | 12/2022 | |

OTHER PUBLICATIONS

Blackwell, David D, et al., "Geothermal resources in Sedimentary Basins", Geothermal Energy Generation in Oil and Gas Settings, Mar. 13, 2006, 28 pages.

Khodayar, Maryam, et al., "Conventional Geothermal Systems and Unconventional Geothermal Developments: An Overview", vol. 14, No. 2, 196-246, Feb. 20, 2024, 51 pages.

Leveni, Martina, et al., "A potential for climate benign direct air $CO_2$ capture with $CO_2$-driven geothermal utilization and storage (DACCUS)", Environmental Research Letters, 19 014007, Nov. 30, 2023, 11 pages.

McCarthy, Kevin, et al., "Geothermal Play Fairway Analysis (GPFA): A Texas/Gulf Coast Case Study", Proceedings, 49th Workshop on Geothermal Reservoir Engineering Stanford University, Feb. 12-14, 2024, 18 pages.

Ogland-Hand, Jonathan D, et al., "Meeting Net-Zero America Direct Air Capture Targets with Sedimentary Basin Geothermal Heat While Considering Environmental Justice", Proceedings, 49th Workshop on Geothermal Reservoir Engineering, Stanford University, Stanford, California, Feb. 12-14, 2024, SGP-TR-227, 2024, 9 pages.

Zhang, Shihan, et al., "Development of a Potassium Carbonate-Based Absorption Process with Crystallization-Enabled High-Pressure Stripping for $CO_2$ Capture: Vapor-Liquid Equilibrium Behavior and $CO_2$ Stripping Performance of Carbonate/Bicarbonate Aqueous Systems", Energy Procedia, vol. 63, pp. 665-675, 2014, 11 pages.

* cited by examiner

CARBON DIOXIDE REMOVAL SYSTEMS USING A GEOTHERMAL HEAT SOURCE

CROSS-REFERENCE TO RELATED APPLICATIONS

This application claims priority to U.S. Provisional Patent Application No. 63/565,601, filed Mar. 15, 2024, entitled "Geothermal Energy Powered Carbon Dioxide Removal System." The above-referenced priority document is incorporated herein by reference.

TECHNICAL FIELD

The following description relates to carbon dioxide removal systems using a geothermal heat source.

BACKGROUND

Carbon dioxide removal technologies have been used to reduce carbon dioxide emissions in the Earth's atmosphere, with the goal of mitigating anthropogenic climate change caused by such emissions. Point source capture technologies have been used to reduce carbon dioxide emissions from flue gas from industrial facilities. Direct air capture (DAC) technologies have been used to remove carbon dioxide from ambient air in the Earth's atmosphere.

DETAILED DESCRIPTION

Figure 1:
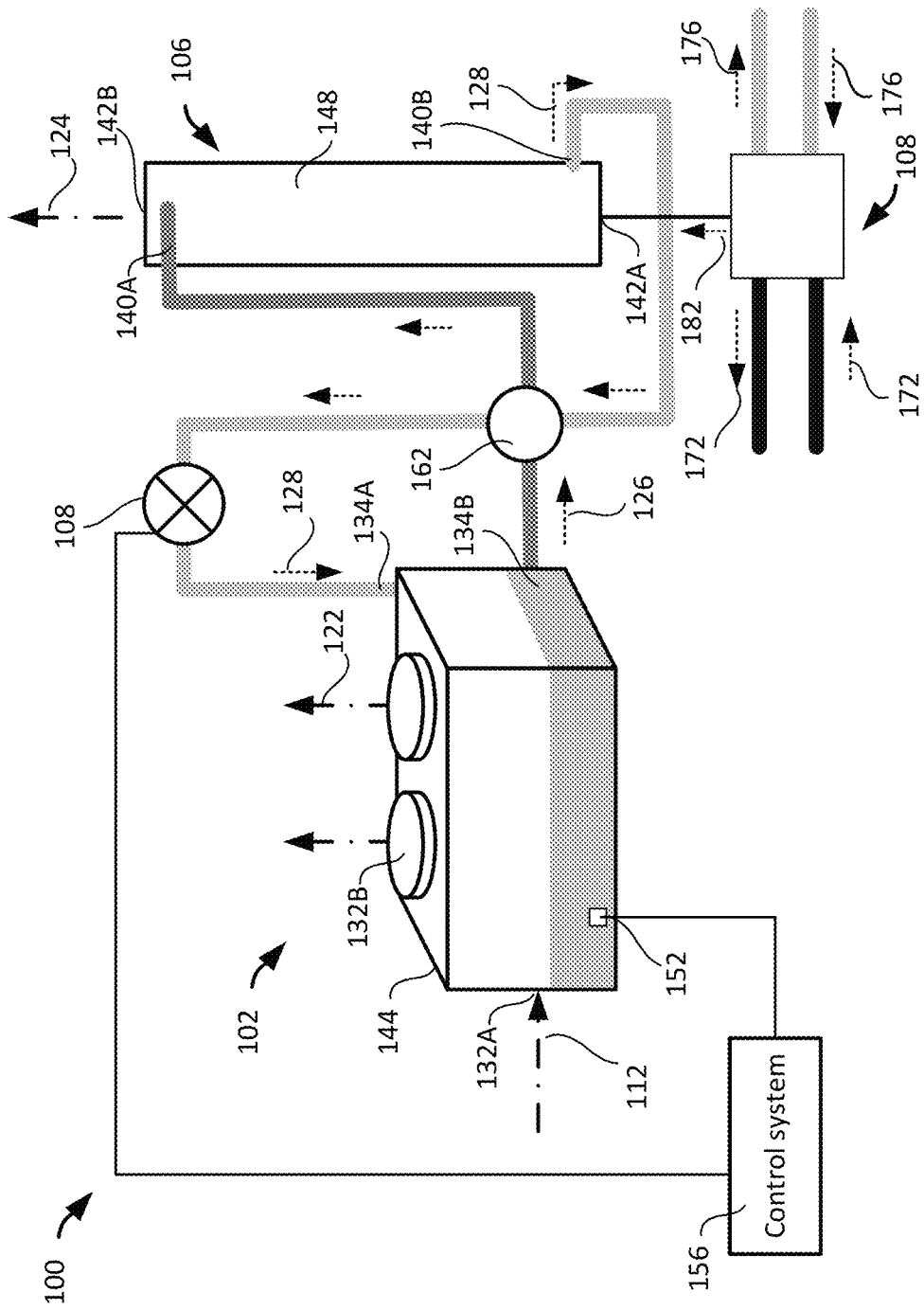
FIG. 1 is a schematic diagram showing aspects of an example carbon dioxide removal system.

In some aspects of what is described here, $CO_2$ gas from a gaseous feed, e.g., ambient air or a flue gas, can be captured and removed by operation of a carbon dioxide removal system. Heat from a geothermal heat source can be used to power the carbon dioxide removal system, e.g., providing input energy for a desorption process or another subsystem. For example, heat from a geothermal heat source may be used to generate steam, which may be passed through a gas-liquid contactor where a desorption process occurs. In the gas-liquid contactor, the steam may interact with (e.g., directly contact) a $CO_2$-rich alkaline capture solution to release dissolved $CO_2$ from the solution. In some instances, the heat from a geothermal heat source may be used in the carbon dioxide removal system in another manner.

In some implementations, a flow of a gaseous feed can be directed into a first gas-liquid contactor of the carbon dioxide removal system. During an absorption process, $CO_2$ gas from the gaseous feed diffuses into and reacts with an alkaline capture solution to form a $CO_2$-rich alkaline capture solution. During a desorption process, the dissolved $CO_2$ can be separated from the $CO_2$-rich alkaline capture solution in a second gas-liquid contactor to regenerate the alkaline capture solution. Heat energy from a geothermal heat source can be used in the desorption process. For example, heat energy from the geothermal heat source can be used to generate steam, and the steam can interact with the $CO_2$-rich alkaline capture solution in the second gas-liquid contactor.

In some implementations, geothermal energy is obtained in the form of thermal energy, for example, from naturally occurring heat sources found in geological formations beneath the earth's surface. In some instances, geothermal energy may be obtained from geothermal working fluids that have been heated by geothermal energy, for example, in subterranean reservoir or another subsurface environment. In some cases, geothermal working fluids are drawn (e.g., through a well, pipe, or another type of conduit) to the surface so the heat can be extracted and used or converted into another form of energy to be received by the carbon dioxide removal system. In some examples, geothermal working fluids may be drawn to the surface by pumps or other means of generating a force on a fluid column. In certain examples, geothermal working fluids may be pushed to the surface by natural subsurface pressures in a fluid reservoir. In some instances, geothermal working fluids may be obtained in another manner. In certain environments, the geothermal working fluids typically take the form of fresh water, superheated water, a brine composed of brackish, or saline water containing some combination of naturally occurring soluble minerals, salts, sediments, petroleum compounds, organic compounds, and dissolved gases. In some instances, the geothermal working fluid may be in the form of steam. The geothermal working fluids can be of natural origin, for instance those occurring and residing naturally in existing geological reservoirs or injected into the subsurface so they can be extracted upon being heated by geothermal energy. In some instances, the geothermal working fluid in the form of dry steam may have a temperature in a range of 100 and 400 degree Celsius; and the geothermal working fluid in the form of a brine may have a temperature in a range of 40 and 400 degree Celsius.

In some instances, the well or channel by which the geothermal working fluids are drawn to the earth's surface are existing geothermal wells, for example, wells that are currently or were previously used to extract geothermal energy. In some instances, the well or channel by which the geothermal working fluids are drawn to the surface may be newly drilled wells or channels built for collecting geothermal energy (e.g., to power carbon dioxide removal systems or for other purposes). In certain instances, the well or channel by which the geothermal working fluids are drawn to the surface are existing wells of the type used by the petroleum and gas industries, for instance abandoned wells or wells previously used for the extraction of petroleum, gas, or related products. In some instances, the $CO_2$ captured by the carbon dioxide removal system may be injected into $CO_2$ sequestration reservoirs co-located with the well or channel from which the geothermal working fluids are obtained.

In some implementations, the systems and techniques described here can provide technical advantages and improvements. For example, the systems and techniques described here may reduce the energy usage for the carbon dioxide removal process by using low to medium temperature heat and to further reduce energy input for the overall carbon dioxide removal process. For another example, the systems and techniques described here may provide synergetic advantages including cost saving in transportation, streamlined infrastructure utilization, and optimized carbon footprint by minimizing energy use and emissions associated with transport. In some instances, the systems and techniques presented here may also benefit from surplus energy from sequestration operations (e.g., power generation facilities, waste heat recovery, etc.), which can be also used to power direct carbon oxide removal systems and enhance overall efficiency. In some cases, a combination of these and potentially other advantages and improvements may be obtained.

FIG. 1 is a schematic diagram showing aspects of an example carbon dioxide removal system 100. In some implementations, the carbon dioxide removal system 100 is configured to perform a carbon dioxide ($CO_2$) capture and removal process by absorbing $CO_2$ gas from a gaseous feed (e.g., ambient air or flue gas) using an alkaline capture solution. At least a portion of the $CO_2$ gas from the gaseous feed can be removed; and the alkaline capture solution can be regenerated and recycled by removing at least a portion of the dissolved $CO_2$. In some instances, the example carbon dioxide system 100 can provide improved energy efficiency by reducing the total energy input needed per a unit weight of $CO_2$ removed; and thus, can reduce the total cost of the $CO_2$ removal process. In some instances, the systems and methods presented here can provide other advantages over conventional carbon dioxide removal processes.

As shown in FIG. 1, the example carbon dioxide removal system 100 includes a first gas-liquid contactor 102 in which an upstream or absorption reaction is performed and a second gas-liquid contactor 106 in which a desorption reaction is performed. During the absorption reaction, at least a portion of the $CO_2$ is removed from the gaseous feed. The $CO_2$ from the gaseous feed is dissolved into the alkaline capture solution forming a $CO_2$-rich alkaline capture solution. During the desorption reaction, at least a portion of the dissolved $CO_2$ is released from the $CO_2$-rich alkaline capture solution and the alkaline capture solution is regenerated.

In some instances, the first gas-liquid contactor 102 includes an interfacial surface structure. The gaseous feeds can be passed through the interfacial surface structure in the first gas-liquid contactor 102. Surfaces of the interfacial surface structure are wetted by the alkaline capture solution, which the $CO_2$ gas from the gaseous feeds diffuses into. In some instances, the first gas-liquid contactor 102 may be implemented as the example gas-liquid contactor 202, 302, 402 in FIGS. 2-4 or in another manner. In some instances, the second gas-liquid contactor 106 may be implemented as a desorption column, a stripping column, or another type of gas-liquid contactor for removing the dissolved $CO_2$ from the $CO_2$-rich alkaline capture solution. The carbon dioxide removal system 100 may include additional or different features, and the components of the carbon dioxide removal system 100 may operate as described with respect to FIGS. 2-4 or in another manner. For example, the carbon dioxide removal system 100 may include multiple first gas-liquid contactors 102 and multiple second gas-liquid contactors 106. In some instances, the number of first gas-liquid contactors 102 may be different from the number of second gas-liquid contactors 106. In some instances, the first gas-liquid contactor 102 may not include an interfacial surface structure and the gaseous feed is bubble through the alkaline capture solution. In this case, the first gas-liquid contactor 102 may be a bubbled column.

In some implementations, a first flow is directed from the gaseous feed 112 to interact with the alkaline capture solution in the first gas-liquid contactor 102 during the first time period. When the gaseous feed is drawn from ambient air, the first gas-liquid contactor 102 operates as a direct air capture (DAC) system configured to directly remove $CO_2$ from the ambient air. The gaseous feed at the gas-liquid contactor 102 has a $CO_2$ concentration below 1000 parts per million (ppm). When the gaseous feed is drawn from an industrial point source, the first gas-liquid contactor 102 may operate as a post combustion capture (PCC) system or point source system configured to remove $CO_2$ from the flue gas. In some instances, the flue gas can be generated from multiple distinct large industrial point sources, which may have different concentrations of $CO_2$. In some instances, the gaseous feed has a $CO_2$ concentration in a range of above 1%, in a range of 1000 ppm to 40 wt %, or another range. In some implementations, the gaseous feed is directed into the first gas-liquid contactor at a pressure in a range of 0.1 to 10,000 psig (pounds per square inch gauge), at a partial pressure of $CO_2$ in a range of 1e-8 to 1e8 psig, or in another range.

As shown in FIG. 1, the first gas-liquid contactor 102 includes a first reactor vessel 144, a first solution inlet 134A, a first solution outlet 134B, a first gas inlet 132A, and a first gas outlet 132B; and the second gas-liquid contactor 106 includes a second reactor vessel 148, a second solution inlet 140A, a second solution outlet 140B, a second gas inlet 142A, and a second gas outlet 142B. The first and second gas-liquid contactors 102, 106 may include other features and components in some cases.

As shown in FIG. 1, the first and second gas-liquid contactors 102, 106 are connected in series. In particular, the first solution inlet 134A is fluidically connected to the second solution outlet 140B; and is configured to receive a recirculation stream 128 containing the regenerated alkaline capture solution (e.g., a $CO_2$-lean alkaline capture solution) from the second gas-liquid contactor 106. The first solution outlet 134B is fluidically connected to the second solution inlet 140A; and is configured to transport the first solution stream 126 containing the $CO_2$-rich alkaline capture solution to the second gas-liquid contactor 106. The first gas inlet 132A is configured to receive the gaseous feed 112 containing ambient air or flue gas for performing the absorption reaction; and the first gas outlet 132B is configured to transport a first gas exhaust stream 122 into atmosphere or into another down-stream processing system for further processing. In some implementations, the second solution inlet 140A is configured to receive the first solution stream 126 from the first gas-liquid contactor 102. The second solution outlet 140B is fluidically connected to the first solution inlet 134A; and is configured to transport the regenerated alkaline capture solution back to the first gas-liquid contactor 102 for recirculating the alkaline capture solution used in the absorption reaction. The second gas outlet 142B is configured to transport a second gas exhaust stream 124 containing $CO_2$ with a concentration in a range of 91-100%.

In some implementations, the alkaline capture solution is an aqueous solution containing a dissolved salt in a form of $a[Q^+]b[X^-]$ forming an aqueous ionic base. The symbol "$Q^+$" represents a cation species, for example, $NH_4^+$, $N(CH_3)_4^+$, $N(ethyl)_4^+$, $N(Butyl)_4^+$, $N(Propyl)_4^+$, $K^+$, $Na^+$, $Ca^{2+}$, or $Mg^{2+}$. The symbol "$X^-$" represents an anion species, for example, $OH^-$, $O^{2-}$, $CO_3^{2-}$, $HCO_3^-$, $Cl^-$, $Br^-$, or $I^-$. The symbols "a" and "b" are integers such that the total charge of the water containing the dissolved salt is neutral. In some instances, the alkaline capture solution may include water, alcohol, glycols, glycerol, polyglycols, glycol ethers, or other chemicals. In some instances, the water may include gray water, brackish water, saline water, or ocean water. In some implementations, the alkaline capture solution includes a weak base of the general formula of $(M)_x(CO_3)_y$ and or $M_x(OH)_y$, where M may include potassium (K), sodium (Na), ammonium ($NH_4$), quaternary ammonium, vanadium (V), platinum (Pt), palladium (Pd), rhodium (Rh), ruthenium (Ru), chromium (Cr), copper (Cu), calcium (Ca), lithium (Li), bismuth (Bi), nickel (Ni), cobalt (Co), manganese (Mn), iron (Fe), molybdenum (Mo), or other ions. The weak base in the alkaline capture solution can have a weight concentration in a range of 0.0001-100% in the alkaline capture solution. In some implementations, the alkaline capture solution further includes a free amino acid. In some implementations, the alkaline capture solution includes a carboxylic acid salt of an amino acid or a mixture of carboxylic acid salts of amino acids dissolved in water with a weight concentration of 0.0001-100%, 0.001-80%, 0.01-60%, 0.1-40%, 1-20%, or another range. In some instances, the pH value of the alkaline capture solution is in a range of 11-14.

In some implementations, the alkaline capture solution further includes an anti-corrosive agent, an anti-foaming agent, additives, or promoters. The anti-corrosive agent can be vanadium pentoxide or other metallic oxides; and the additives or promoters can be MEA (monoethanolamine), DEA (diethanolamine), TEA (triethanolamine), MDEA (methyl diethanolamine), piperazine, or other free amines, $KVO_3$ (potassium metavanadate), or another type of material. The anti-foaming agent can be inert liquid chemicals such as mineral oil, silicon, and/or hydrophobic polyol, a hydrophobic solid, such as hydrophobic silica, ethylene-bis-stearamide, fatty acid, and/or fatty alcohol. In some instances, the anti-foaming agent is insoluble in the alkaline capture solution. In some instances, the anti-foaming agent may be silicone based or non-silicon based.

In some implementations, the alkaline capture solution includes a phase transfer catalyst or agent with the structure in a form of $c[M+]d[Y^-]$. The phase transfer catalysts are added to the alkaline capture solution to reduce interfacial surface tension and promote mixing in gas-liquid or gas-liquid-solid systems. The symbol "$M^+$" represents a cation species; and the symbol "$Y^-$" represents an anion species. The symbols "c" and "d" are integers such that the total charge is neutral. In some implementations, the phase transfer catalyst has a form of $M-O-(OH)_x$, where M is Pt, Pd, Ru, V, Cu, Al, Cr, Co, Ni, Mo, or Ti. In some instances, $M^+$ can be tetrabutyl ammonium, tetramethylammonium, trimethyl butyl ammonium, ethyltrimethyl ammonium, ethyl methyl butyl ammonium, diethyl dimethyl ammonium or other alkylammonium species; and $Y^-$ can be hydroxide ($OH^-$), fluorine ($F^-$), carbonate ($CO_3^{2-}$), bicarbonate ($HCO_3^-$), or other anions. In some implementations, the phase transfer catalyst in the alkaline capture solution has a weight concentration of 0.001-100% or in another range. In some instances, the alkaline capture solution can maintain a $CO_2$ capture rate equal to or greater than 75% of the $CO_2$ capture rate during the first cycle through 10-5000 cycles.

As shown in FIG. 1, the first gas-liquid contactor 102 includes a monitoring unit 152 which may include a pH sensor, a $CO_2$ sensor, a temperature sensor, or a combination of these or other types of sensors. The monitoring unit 152 is communicably connected to a control system 156 which can be used to read signals from the monitoring unit 152 and to determine the characteristics of the liquid in the first gas-liquid contactor 102, e.g., the pH value, the $CO_2$-rich complex concentration, the temperature, the concentration of dissolved $CO_2$, or other characteristics of the liquid in the first gas-liquid contactor 102. In some instances, the first gas-liquid contactor 102 may include multiple monitoring units 152. In some instances, the first gas-liquid contactor 102 may include other types of sensors to monitor liquid level, flow rate, purity, density, weight, and other operation conditions. In some instances, the monitoring devices 152 may include measurement or analytical instrumentation such as in-situ Raman or infrared (IR) spectroscopy for yield sensing, gas chromatography, mass spectrometry, an auto-titrator, or other types of monitoring devices.

In some instances, the first gas-liquid contactor 102 may include other components or elements. For example, the first gas-liquid contactor 102 may include a pump, an air mover, a demister, and other components. Components of the first gas-liquid contactor 102 may be communicably connected to and controlled by the control system 156. For example, the first gas-liquid contactor 102 can include a pump that circulates the alkaline capture solution through the interfacial surface structure in the first gas-liquid contactor 102 during the first time period for absorbing $CO_2$ from the gaseous feed. For another example, the air mover that directs the flow of the gaseous feed can be stopped, for example, when the concentration of the dissolved $CO_2$ in the $CO_2$-rich alkaline capture solution in the first gas-liquid contactor 102 reaches a predetermined threshold value. The first gas-liquid contactor 102 may include another pump, which can be activated to pump the first solution stream 126 to transfer the $CO_2$-rich alkaline capture solution to the second gas-liquid contactor 106. In some cases, when the $CO_2$-rich alkaline capture solution has been transferred out of the first gas-liquid contactor 102 and the regenerated alkaline capture solution is received at the first gas-liquid contactor 102, the air mover to direct the flow of the gaseous feed can be activated. In some instances, the control system 156 may be configured to perform other control operations.

In some implementations, the second gas-liquid contactor 106 is a multi-tray stripping or desorption column to produce pure or high-purity $CO_2$ gas during desorption and regenerate the alkaline capture solution which can be recycled and used in the absorption reaction in the first gas-liquid contactor 102. In some instances, the second-liquid contactor 106 can receive a second gaseous stream 182. The second gaseous stream 182 contains steam generated by operation of a steam generator 108. In some instances, the steam generator 108 may be powered completely or at least partially by geothermal energy (e.g., shown in FIGS. 2-4). In some instances, the steam generator 108 and other components (e.g., air mover, pumps, etc.) of the example system 100 may be partially or completely powered by electricity which can be generated by an energy conversion device configured to convert solar energy, wind energy, or other renewable energy to electricity. In some instances, the generated electricity can be stored locally on site using a backup storage module. In some instances, the second gas-liquid contactor 106 may include industrial moisture recovery systems (e.g., the condenser/reflux drum 276/278, 376/378, 476/478 as shown in FIGS. 2-4) to condense the steam and water vapor back into liquid form and prevent any water loss.

In some instances, the second gaseous stream 182 received at the second gas-liquid contactor 106 is configured to heat the $CO_2$-rich alkaline capture solution in the second gas-liquid contactor 106 to a temperature less than 200 degrees Celsius, e.g., in a range of 90-150° C., to reversibly release at least a portion of the dissolved $CO_2$ from the $CO_2$-rich alkaline capture solution with a conversion efficiency in a range of 30-100% and a selectivity in a range of 93-100%. The gas exhausted from the second gas outlet 142B includes $CO_2$ with a concentration in a range of 91-100%. The gas exhaust from the second gas outlet 142B may be collected and compressed for geological sequestration or utilization in other applications.

Figure 2:
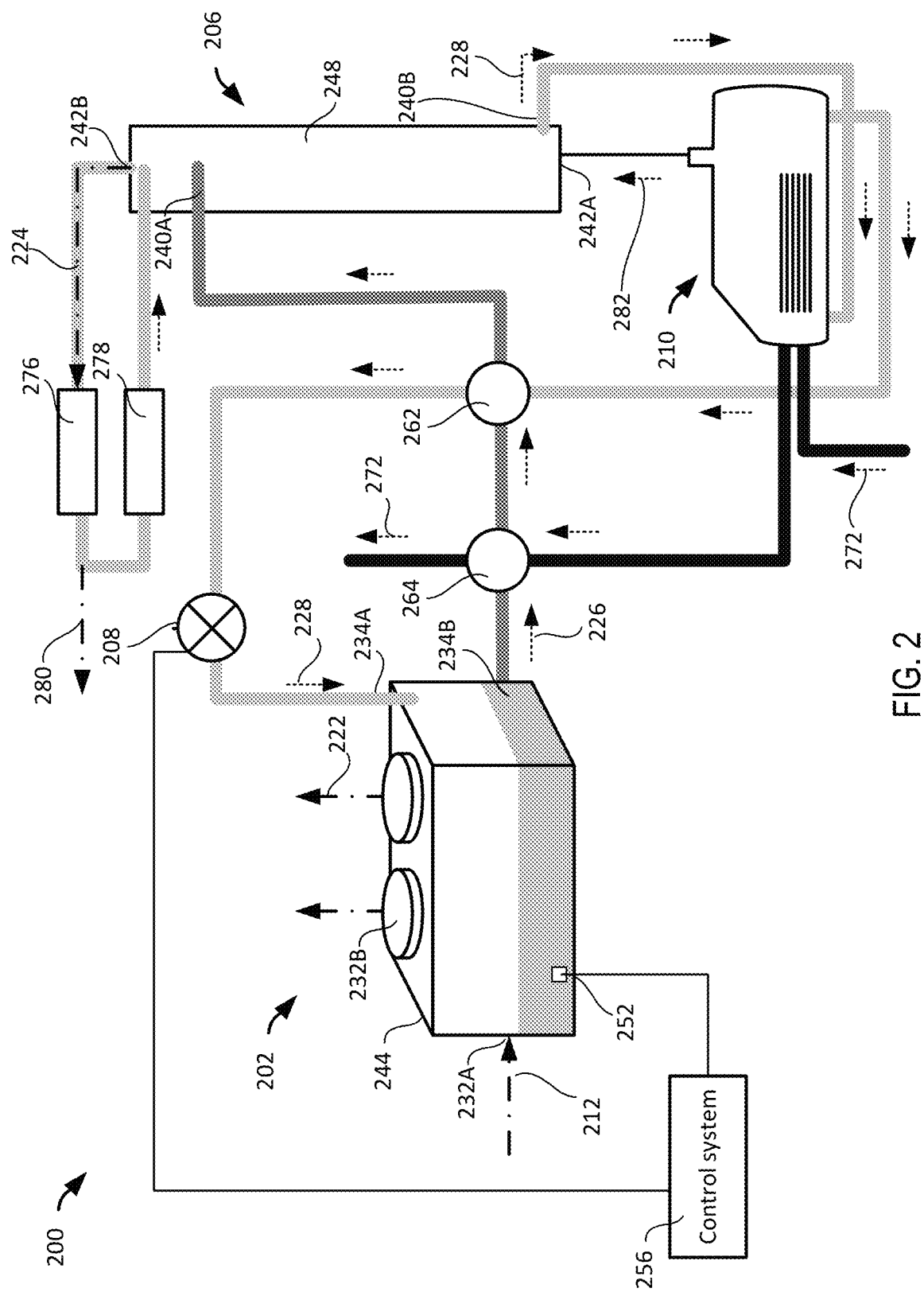
FIG. 2 is a schematic diagram showing aspects of an example carbon dioxide removal system.
Figure 3:
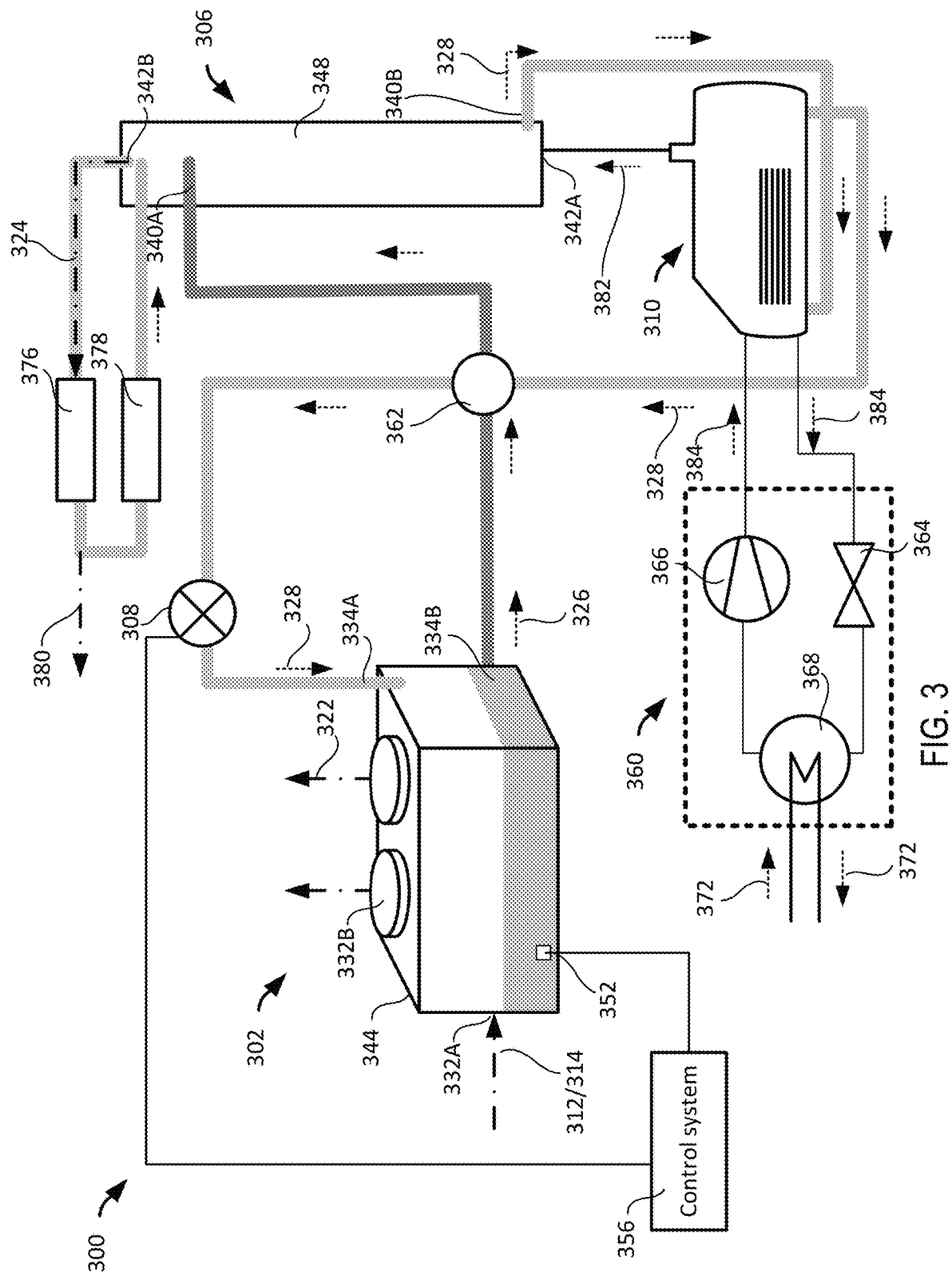
FIG. 3 is a schematic diagram showing aspects of an example carbon dioxide removal system.
Figure 4:
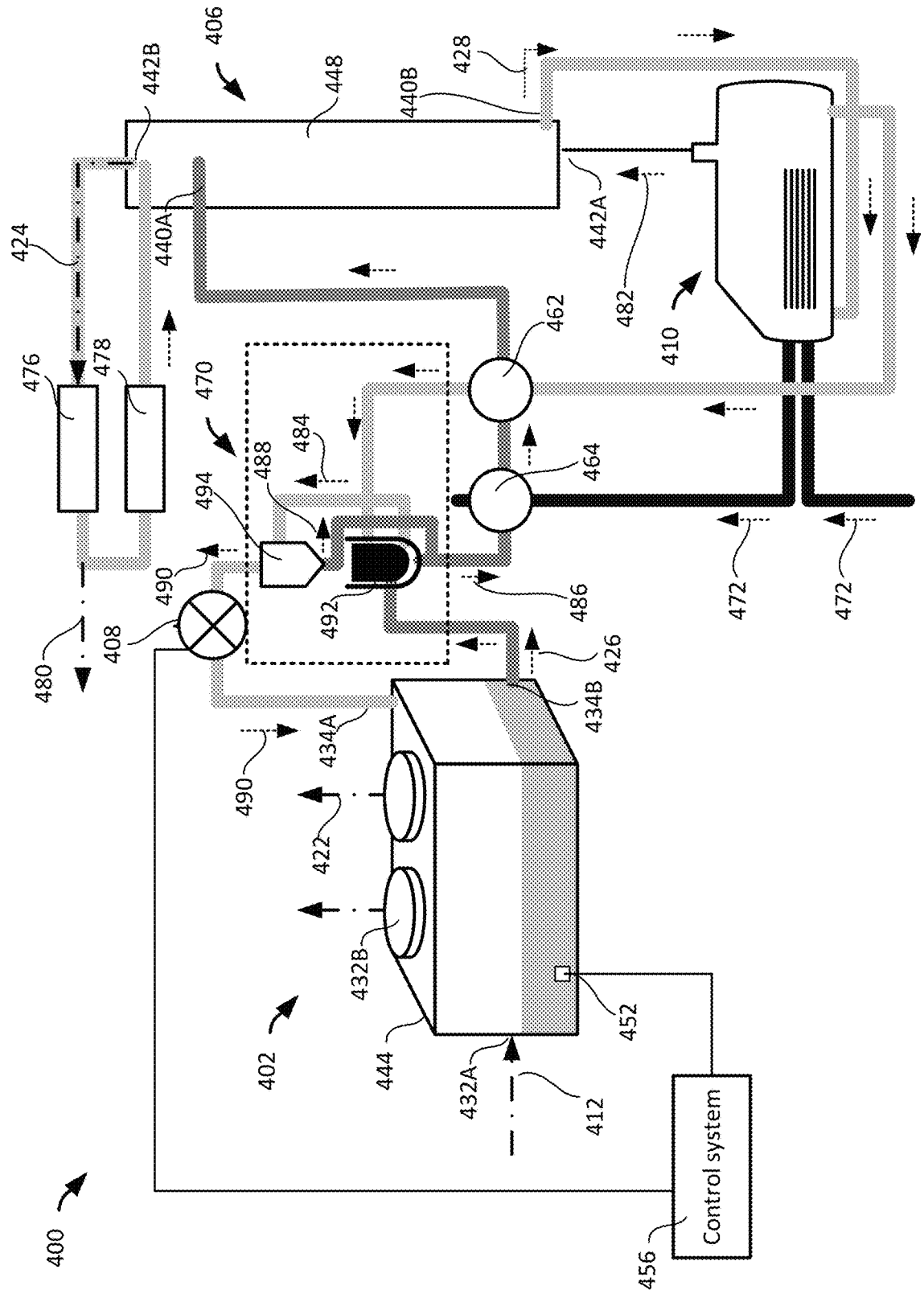
FIG. 4 is a schematic diagram showing aspects of an example carbon dioxide removal system.

In some instances, the steam generator 108 may be implemented as a reboiler heater 210, 310, 410 as shown in FIGS. 2-4, or another type of boiler. As shown in FIG. 1, the steam generator 108 receives a flow of geothermal working fluid carrying geothermal energy in a geothermal fluid stream 172 and a flow of an aqueous solution in a water supply stream 176, and heat energy is transferred from the geothermal fluid stream 172 to the water supply stream 176 to generate steam. In some instances, the downstream of the geothermal fluid stream 172 may be further used to provide energy input to the carbon dioxide removal system, for example, as shown in FIGS. 2 and 4 or in another manner. In some instances, the downstream of the geothermal fluid stream 172 can be returned to the subterranean reservoir or another subsurface environment. In some instances, the downstream of the water supply stream 176 may have a lower water content and a higher concentration of chemicals compared to the upstream of the water supply stream 176, due to the removal of water and generation of steam. In some instances, the water supply stream 176 may be obtained within the carbon dioxide removal system 100. For example, the water supply stream 176 may include the $CO_2$-lean alkaline capture solution from the second gas-liquid contactor 106 (e.g., may be at least part of the recirculation stream 128), the $CO_2$-rich alkaline capture solution from the first gas-liquid contactor 102 (e.g., the reboiler heater 108 in this case is used as a stripping column and can be used to replace the second gas-liquid contactor 106), condensed water obtained from the gaseous exhaust stream 124, or obtained in another manner.

In some instances, the geothermal fluid stream 172 is obtained from a well, a pipe, or a channel. The example geothermal fluid stream 172 includes geothermal working fluids that have been heated by geothermal energy, for example, in a subterranean environment. In some examples, the geothermal working fluids are drawn to the surface (e.g., through a well or another source) so the heat can be extracted from the geothermal working fluids. In some examples, the geothermal working fluids may be drawn to the surface either by pumps or other means of generating a force on the fluid column. In certain examples, the geothermal working fluids may be pushed to the surface by natural subsurface pressures in the fluid reservoir. In some instances, the geothermal working fluids may be obtained in another manner. The geothermal working fluids can be of natural origin, for instance those occurring and residing naturally in existing geological reservoirs or injected into the subsurface so they can be extracted upon being heated by geothermal energy.

In some instances, the geothermal working fluid may include dry steam, or flashed steam. For example, "dry steam" having a temperature ranging from 101° C. to 400° C. can be obtained from geothermal reservoirs that are located in shallow subsurface reservoirs typically at depths of less than 2000 meters. The dry steam is suitable for direct use or to power the reboiler heater 108 to generate steam for the second gas-liquid contactor 106. In some cases, so-called "flashed steam" can be obtained from reservoirs that are shallow and produces superheated water or brine with temperatures ranging from 101° C. to 300° C., which can be flashed into steam through a flash chamber. Both dry steam and flashed steam can be used for generating steam in the reboiler heater 108; and the steam generated from the reboiler heater 108 can be directly used to heat the second gas-liquid contactor 106.

In certain instances, the geothermal working fluids typically take the form of fresh water, a brine composed of brackish, or saline water containing some combination of naturally occurring soluble minerals, salts, sediments, petroleum compounds, organic compounds, and dissolved gases.

In some implementations, the geothermal heat source includes a "Sedimentary geothermal resource", which includes sedimentary aquifers that have porous and sandy formations located in basins at depths between 1000 to 10,000 meters that have sufficient temperature and permeability to support production of commercial quantities of geothermal working fluids. These systems may involve vertical or deviated wells, optionally with laterals, and can be new or existing wells, potentially requiring workover for optimization. Superheated brine with a temperature in a range between 100° C. and 300° C. and heated brine with a temperature in a range between 70° C. and 100° C. suitable for direct heat extraction or exchanging heat to a secondary working fluid can be used. In some instances, a sedimentary geothermal resource is also known as a hot sedimentary aquifer (HSA), stratigraphic geothermal resource, a sedimentary hydrothermal reservoir geothermal resource, etc. In some implementations, the geothermal heat source where a geothermal working fluid can be obtained for providing energy input to the desorption reaction can be from existing oil and gas infrastructure, including existing wells in abandoned oil fields, new wells dilled in existing oil fields, etc.

In some implementations, the geothermal heat source includes an "Enhanced geothermal resource", which includes stimulated rock typically beneath the sedimentary layer. In some instances, fracked ("stimulated") rock can create extra fractures and channels in the rock for more heat transfer. With temperatures ranging from 100° C. to 350° C., superheated water, brine, or steam for direct heat extraction or exchanging heat with a secondary working fluid can be used. "Advanced geothermal" resources exploit solid rock formations at depths of 1000 to 10,000 meters, offering temperatures between 100° C. to 350° C. Superheated water, brine, or steam can be obtained from such geothermal resources which can be used for direct heat extraction or exchanging heat with a secondary working fluid. In some instances, to use the enhanced and advanced geothermal resources, water or another fluid can be injected into the fracked or drilled rock.

In some implementations, the steam generated by the steam generator 108 is carried by the second gaseous feed 182 and injected into the second gas-liquid contactor 106 from the bottom of the contactor 106; then rises through the vessel 148 contacting the $CO_2$-rich alkaline capture solution; the steam can heat the $CO_2$-rich alkaline capture solution, causing at least a portion of $CO_2$ released from the $CO_2$-rich alkaline capture solution; and the steam can carry the released $CO_2$ upward to form the second gas exhaust stream 124. In some instances, the second gas-liquid contactor 106 may be also heated in another manner. For example, the second gas-liquid contactor 106 may be further heated by a jacket which may be powered by hot water, hot brine, or steam from a geothermal heat source. For another example, the second gas-liquid contactor 106 may be further heated by other heat exchangers powered by renewable electricity (e.g., electricity generated by solar panels, wind turbines, or other clean energy conversion devices and stored in various energy storage systems or devices). During the irreversible release of the dissolved $CO_2$ from the $CO_2$-rich alkaline capture solution, the alkaline capture solution is regenerated (e.g., the $CO_2$-lean alkaline capture solution). The regenerated alkaline capture solution may be stored and circulated back to the first gas-liquid contactor 102 for performing the absorption reaction. In some instances, the regenerated alkaline capture solution includes a $CO_2$-lean alkaline capture solution with a baseline or a negligible level of dissolved $CO_2$ concentration. In some instances, the $CO_2$-lean alkaline capture solution or the regenerated alkaline capture solution has a pH value in a range of 11-14. In some implementations, the regenerated alkaline capture solution at the second solution outlet 140B has a temperature greater than the $CO_2$-rich alkaline capture solution received at the second solution inlet 140A.

During the first time period, the interfacial surface structure in the first gas-liquid contactor 102 is wetted by the alkaline capture solution; the flow from the gaseous feed 112 is directed across the interfacial surface structure in the first gas-liquid contactor 102; and at least a portion of the $CO_2$ in the gaseous feed 112 diffuses into the alkaline capture solution on the surfaces of the interfacial surface structure. The $CO_2$ concentration in the alkaline capture solution increases over time forming the $CO_2$-rich alkaline capture solution. In some implementations, the $CO_2$ concentration in the $CO_2$-rich alkaline capture solution becomes greater than the $CO_2$ concentration of the initial alkaline capture solution. The pH value of the $CO_2$-rich alkaline capture solution in the first gas-liquid contactor 102 can be monitored in real-time or periodically, by operation of the monitoring unit 152. In response to the $CO_2$-rich alkaline capture solution meeting one or more predetermined criteria, e.g., the $CO_2$ concentration of the $CO_2$-rich alkaline capture solution being greater than a $CO_2$ concentration threshold value (e.g., 1 mol %, 5 mol %, 10 mol %, 20 mol %, 50 mol %, 65 mol % or another value) or being within a $CO_2$ concentration range (e.g., 1-65 mol %) which corresponds to the pH value of the $CO_2$-rich alkaline capture solution being equal to or less than a pH threshold value (<11) or being within a pH range (e.g., 9-11) the flow from the gaseous feed 112 can be stopped.

In response to the $CO_2$-rich alkaline capture solution meeting one or more predetermined criteria (e.g., the $CO_2$ concentration of the $CO_2$-rich alkaline capture solution being greater than a $CO_2$ concentration threshold value (e.g., 20 mol %, 30 mol %, 40 mol %, 50 mol %, 70 mol %, 80 mol %, 90 mol %, 100 mol %, or another value) or being within a $CO_2$ concentration range 20-100 mol % which corresponds to the pH value of the $CO_2$-rich alkaline capture solution being equal to or less than a pH threshold value (e.g., <9) or being within a pH range (e.g., 7-9)) the first solution stream 126 can be activated; and the $CO_2$-rich alkaline capture solution is transported from the first gas-liquid contactor 102 to the second gas-liquid contactor 106. In some instances, the first gaseous output stream 122 may include $CO_2$-stripped air, $N_2$ and $O_2$, or other gas.

In some instances, the ambient air and the flue gas may include nitrogen oxides (NOx), sulfur oxide (SOx), or other gases. The NOx and SOx in the ambient air and flue gas may be absorbed by the alkaline capture solution or the $CO_2$-rich alkaline capture solution in the first gas-liquid contactor 102. Precipitation may be formed in the alkaline capture solution. In some instances, the carbon dioxide removal system 100 may include one or more inline filters (e.g., containing active charcoal or another material) configured to filter out the precipitation formed from the absorption of the NOx and SOx in the alkaline capture solution or the $CO_2$-rich alkaline capture solution, prior to being transferred to the second gas-liquid contactor 106.

In some implementations, the gaseous output stream 124 of the second gas-liquid contactor 106 includes $CO_2$ gas having a purity in a range of 91-100-wt % or another range. The $CO_2$ gas obtained during the desorption process may be compressed and used as a low global warming refrigerant, in green houses for enhanced productivity, welding, feedstock for urea and to other useful chemicals and/or liquid fuels, to provide low global warming heating or cooling, used as feedstock for urea other useful chemicals, fuels, concrete/cement, as a blowing agent, carbonated beverages, in greenhouses for nursery and vegetation, or sequestered underground in geological formations or offshore or onshore depleted oil fields where the $CO_2$ gas can be stored (e.g., geological sequestration), or in other applications.

In some instances, the example carbon dioxide removal system 100 may include various fluid handling components, including spray head, nozzles, valves, pumps, pipes, air movers, etc. for controlling the flow of liquids and gases. In some instances, the control system 156 is configured to communicate with the monitoring unit 152 and the various fluid handling components (e.g., the pump 108), the heating unit 154 of the second gas-liquid contactor 106 for controlling the desorption reaction in the second gas-liquid contactor 106. In some implementations, the control system 156 may include computation apparatus, a memory unit, an input/output interface, or other components that allow the communication of the control system with other components of the example carbon dioxide removal system 100, determine control parameter values of the components of the example carbon dioxide removal system 100, and optimize the carbon dioxide removing performance of the example carbon dioxide removal system 100. In some instances, the control system may be configured for performing other functions.

As shown in FIG. 1, the example carbon dioxide removal system 100 includes a heat exchanger 162. In some instances, during the desorption reaction in the second gas-liquid contactor 106, the $CO_2$-rich alkaline capture solution is in directed contact with and heated by the steam generated by the steam generator 108, the $CO_2$-lean alkaline capture solution in the second gas-liquid contactor 106 from the second solution outlet 140B may have a temperature in a range of 0-120 degree Celsius. The heat exchanger 162 is configured to recycle at least a portion of the heat from the $CO_2$-lean alkaline capture solution from the second gas-liquid contactor 106; and transfer heat from the recirculation stream 128 to the first solution stream 126. In particular, the heat exchanger 162 is configured to transfer heat from the $CO_2$-lean alkaline capture solution in the recirculation stream 128 from the second gas-liquid contactor 106 to the $CO_2$-rich alkaline capture solution in the first solution stream 126 from the first gas-liquid contactor 102. In some instances, the heat exchanger 162 may have a shell-tube structure, a stacked-plate structure, double pipe structure, or another structure.

FIG. 2 is a schematic diagram showing aspects of an example carbon dioxide removal system 200. In some implementations, the carbon dioxide removal system 200 is configured to perform a $CO_2$ capture and removal process assisted by geothermal energy by absorbing $CO_2$ gas from a gaseous feed (e.g., ambient air or flue gas) using an alkaline capture solution. At least a portion of the $CO_2$ gas in the gaseous feed can be removed. The alkaline capture solution can be regenerated and recycled by removing at least a portion of the dissolved $CO_2$. In some instances, the carbon dioxide removal system 200 may be used when the temperature of a geothermal working fluid from a geothermal site is in a range of greater than 110 degrees Celsius or another range. In some instances, the example carbon dioxide system 200 can provide improved energy efficiency by reducing the total energy input needed per a unit weight of removed $CO_2$ gas; and thus, can reduce the total cost of the $CO_2$ removal process. In some instances, the systems and methods presented here may provide other advantages over conventional carbon oxide removal processes.

As shown in FIG. 2, the example carbon dioxide removal system 200 includes a first gas-liquid contactor 202 configured to perform an absorption reaction by removing at least a portion of the $CO_2$ from a gaseous feed 212 containing ambient air or flue gas. The $CO_2$ from the gaseous feed can be dissolved into and react with the alkaline capture solution, thereby forming a $CO_2$-rich alkaline capture solution. The example carbon dioxide removal system 200 further include a second gas-liquid contactor 206 configured to perform a desorption reaction by separating at least a portion of the dissolved $CO_2$ from the $CO_2$-rich alkaline capture solution received from the first gas-liquid contactor 202 and regenerating the alkaline capture solution which can be fed back to the first gas-liquid contactor 202 and reused in the absorption reaction. The absorption and desorption reactions are continuously performed to remove $CO_2$ from the gaseous feed 212 and regenerate the alkaline capture solution. In some instances, the first and second gas-liquid contactors 202, 206 may be implemented as the first and second gas-liquid contactors 102, 106 in the example system 100 shown in FIG. 1 or in another manner.

As shown in FIG. 2, the first gas-liquid contactor 202 includes a first reactor vessel 244, a first solution inlet 234A, a first solution outlet 234B, a first gas inlet 232A, and a first gas outlet 232B; and the second gas-liquid contactor 206 includes a second reactor vessel 248, a second solution inlet 240A, a second solution outlet 240B, a second gas inlet 242A, and a second gas outlet 242B. The first and second gas-liquid contactors 202, 204 may include other features and components in some cases. As shown in FIG. 2, the components of the first and second gas-liquid contactors 202, 206 may be implemented, connected as the corresponding components of the first and second gas-liquid contactors 102, 106 in the example system 100; and may be operated as described in the operations of the example process 400 in FIG. 4 or in another manner.

As shown in FIG. 2, the example carbon dioxide removal system 200 further includes a first heat exchanger 262, a second heat exchanger 264, and a reboiler heater 210. In some instances, the $CO_2$-rich alkaline capture solution, when transferred from the first gas-liquid contactor 202 to the second gas-liquid contactor 206, can be heated by operation of the first and second heat exchanger 262, 264. Furthermore, during the desorption reaction in the second gas-liquid contactor 206, the $CO_2$-rich alkaline capture solution is also heated by operation of the reboiler heater 210. In some instances, the first and second heat exchangers 262, 264 and the reboiler heater 210 are configured such that the $CO_2$-lean alkaline capture solution in the second gas-liquid contactor 206 has a temperature in a range of 0-120 degree Celsius. As shown in FIG. 2, the first heat exchanger 262 is configured to recycle at least a portion of the heat energy from the $CO_2$-lean alkaline capture solution, and allow heat transfer between the first solution stream 226 and the recirculation stream 228. In particular, the first heat exchanger 262 is configured to transfer heat from the $CO_2$-lean alkaline capture solution in a recirculation stream 228 from the second gas-liquid contactor 206 to the $CO_2$-rich alkaline capture solution in a solution stream 226 from the first gas-liquid contactor 202. In some instances, the first heat exchanger 262 may have a shell-tube structure, a stacked-plate structure, or another structure.

In some implementations, the reboiler heater 210 is configured to leverage a geothermal working fluid (e.g., superheated water, brine, steam, etc.) in a temperature range of 100-300 degree Celsius to provide heat energy to the desorption reaction needed in the second gas-liquid contactor 206. As shown in FIG. 2, the $CO_2$-lean alkaline capture solution from the second gas-liquid contactor 206 is received by the reboiler heater 210 and heat extracted from the geothermal working fluid in the solution stream 272 can be passed to the $CO_2$-lean alkaline capture solution to generate steam. In some instances, the downstream of the geothermal fluid stream 272 exiting the heat exchanger 264 can be returned to the subterranean reservoir or another subsurface environment. The generated steam can be passed to the second gas-liquid contactor 206 via a second gaseous stream 282.

In some implementations, the second heat exchanger 264 is configured to utilize the remaining heat in the geothermal working fluid (e.g., 60-150 degree Celsius) from the reboiler heater 206 to heat up the $CO_2$-rich alkaline capture solution (~10~90 degree Celsius) to a temperature in a range of 20-150 degree Celsius. In some instances, the geothermal working fluid departing from the reboiler heater 210 may be returned to the geothermal site or used for absorption. In some instances, depending on the geothermal source, the first heat exchanger 262 may be optional.

As shown in FIG. 2, the example system 200 includes a condenser 276 configured to receive the second gas exhaust stream 224 from the second gas-liquid contactor 206 to separate $CO_2$ gas from water vapor or steam; and a reflux drum 278 configured to collect the condensed liquid reflux from the condenser 276 and to provide a reservoir for temporary storage before it is returned to the second gas-liquid contactor 206. In some instances, the condensed liquid reflux may be collected and used in another manner. For example, the condensed liquid reflux can be received at the reboiler heater 210 in the water supply stream to generate steam for the second gas-liquid contactor 206. In some implementations, a third gas exhaust stream 280 from the condenser 276 contains $CO_2$ gas with a concentration in a range of 91-100%.

FIG. 3 is a schematic diagram showing aspects of an example carbon dioxide removal system 300. In some implementations, the carbon dioxide removal system 300 is configured to perform a $CO_2$ capture and removal process assisted by geothermal energy by absorbing $CO_2$ gas from a gaseous feed (e.g., ambient air or flue gas) using an alkaline capture solution. At least a portion of the $CO_2$ gas in the gaseous feed can be removed. The alkaline capture solution can be regenerated and recycled by removing at least a portion of the dissolved $CO_2$. In some instances, the carbon dioxide removal system 300 may be used when the temperature of a geothermal working fluid from a geothermal site is in a range of greater than 60 degrees Celsius or another range. In some instances, the example carbon dioxide system 300 can provide improved energy efficiency by reducing the total energy input needed per a unit weight of $CO_2$ removed; and thus, can reduce the total cost of the $CO_2$ removal process. In some instances, the systems and methods presented here may provide other advantages over conventional carbon oxide removal processes.

As shown in FIG. 3, the example carbon dioxide removal system 300 includes a first gas-liquid contactor 302 configured to perform an absorption reaction by removing at least a portion of the $CO_2$ from a gaseous feed 312 containing ambient air or flue gas. The $CO_2$ from the gaseous feed can be dissolved into the alkaline capture solution, thereby forming a $CO_2$-rich alkaline capture solution. The example carbon dioxide removal system 300 further include a second gas-liquid contactor 306 configured to perform a desorption reaction by separating at least a portion of the dissolved $CO_2$ from the $CO_2$-rich alkaline capture solution received from the first gas-liquid contactor 302 and regenerating the alkaline capture solution which can be fed back to the first gas-liquid contactor 302 and reused in the absorption reaction. The absorption and desorption reactions are continuously performed to remove $CO_2$ from the gaseous feed 312 and regenerate the alkaline capture solution. In some instances, the first and second gas-liquid contactors 302, 306 may be implemented as the first and second gas-liquid contactors 102, 106 in the example system 100 shown in FIG. 1 or in another manner.

As shown in FIG. 3, the first gas-liquid contactor 302 includes a first reactor vessel 344, a first solution inlet 334A, a first solution outlet 334B, a first gas inlet 332A, and a first gas outlet 332B; and the second gas-liquid contactor 306 includes a second reactor vessel 348, a second solution inlet 340A, a second solution outlet 340B, a second gas inlet 342A, and a second gas outlet 342B. The first and second gas-liquid contactors 302, 304 may include other features and components in some cases. As shown in FIG. 3, the components of the first and second gas-liquid contactors 302, 306 may be implemented, connected as the corresponding components of the first and second gas-liquid contactors 102/202/402, 106/206/406 in the example systems 100, 200, 400; and may be operated as described in the operations of the example process 500 in FIG. 5 or in another manner. The example system 300 further includes a condenser 376 and a reflux drum 378, which may be implemented as the respective components in the example system 200 or in another manner.

The carbon dioxide removal system 300 includes a heat pump 310 configured to allow the carbon dioxide removal system 300 to leverage the cheap geothermal energy from a geothermal heat source to decrease the total electricity consumption. As shown in FIG. 3, the geothermal working fluid received at the heat pump 360 can be used to evaporate and/or heat a heat pump fluid or refrigerant into a vapor in a heat exchanger 368, thus transferring the heat energy to the evaporated heat pump fluid or refrigerant. The vapor is then compressed by a compressor 366 which compresses the vapor into higher pressure gas and further increases the temperature. For example, the geothermal heat source may be a geothermal working fluid having a temperature in a range of 60-150. In some instances, a solution stream 384 containing the heat pump fluid or refrigerant (e.g., a secondary working fluid) at a higher temperature can be received at the reboiler heater 310. In some instances, the heat pump fluid may include Chlorofluorocarbons (CFCs) and Hydrochlorofluorocarbons (HCFCs), Hydrofluorocarbons (HFCs), Hydrocarbons, Hydrofluoroolefins (HFOs), Ammonia, supercritical $CO_2$, or another type of heat pump fluid.

As shown in FIG. 3, the $CO_2$-lean alkaline capture solution from the second gas-liquid contactor 306 is received by the reboiler heater 310 and heat extracted from the heat pump fluid or refrigerant in the solution stream 384 can be passed to the $CO_2$-lean alkaline capture solution to create steam. The generated steam can be passed to the second gas-liquid contactor 306 in a second gaseous stream 382. The thermal energy carried by the $CO_2$-lean alkaline capture solution departing from the reboiler heater 310 can be further used. For example, the $CO_2$-lean alkaline capture solution departing from the reboiler heater 310 can be received by a heat exchanger 362 and heat can be transferred to the $CO_2$-rich alkaline capture solution departing from the first gas-liquid contactor 302 prior to reaching the second gas-liquid contactor 306. In some instances, the heat exchanger 362 may be implemented as the heat exchanger 162, 262 in FIGS. 1-2 or in another manner. The solution stream 384 from the reboiler heater 310 is then passed through an expansion valve 364 which is configured to regulate pressure and temperature of the solution stream 384. In some instances, the geothermal working fluid from the heat pump may be returned back to the geothermal site.

In some implementations, the heat pump 360 can be partially powered by electricity, e.g., the compressor 366 of the heat pump may be operated by electricity. The use of a heat pump paired with a geothermal heat source can result in huge electricity savings. Depending on the geothermal heat source, the coefficient of performance (COP), which is defined by the amount of heat provided by a certain amount of electricity, of the carbon dioxide removal system 300 may be in a range of 2-30 (MWh thermal/MWh electrical) or in another range.

FIG. 4 is a schematic diagram showing aspects of an example carbon dioxide removal system 400. In some implementations, the carbon dioxide removal system 400 is assisted by geothermal energy and configured to perform a $CO_2$ capture and removal process by absorbing $CO_2$ gas from a gaseous feed (e.g., ambient air or flue gas) using an alkaline capture solution. At least a portion of the $CO_2$ gas in the gaseous feed can be removed. The alkaline capture solution can be regenerated and recycled by removing at least a portion of the dissolved $CO_2$. In some instances, the carbon dioxide removal system 400 may be used when the temperature of a geothermal working fluid from a geothermal site is in a range of greater than 90 degrees Celsius or another range. In some instances, the example carbon dioxide system 400 can provide improved energy efficiency by reducing the total energy input needed per a unit weight of removed $CO_2$ gas; and thus, can reduce the total cost of the $CO_2$ removal process. In some instances, the systems and methods presented here may provide other advantages over conventional carbon oxide removal processes.

As shown in FIG. 4, the example carbon dioxide removal system 400 includes a first gas-liquid contactor 402 configured to perform an absorption reaction by removing at least a portion of the $CO_2$ from a gaseous feed 412 containing ambient air or flue gas. The $CO_2$ from the gaseous feed can react with the alkaline capture solution, thereby forming a $CO_2$-rich alkaline capture solution in the first gas-liquid contactor 402. In some instances, the $CO_2$-rich alkaline capture solution may include a homogenous liquid mixture (e.g., liquid solutions) or an inhomogeneous liquid mixture (e.g., solid particles suspended in a liquid medium, slurries, suspensions, etc.). The example carbon dioxide removal system 400 further include a second gas-liquid contactor 406 configured to perform a desorption reaction by separating at least a portion of the dissolved $CO_2$ from the $CO_2$-rich alkaline capture solution received from the first gas-liquid contactor 402 and regenerating the alkaline capture solution which can be fed back to the first gas-liquid contactor 402 and reused in the absorption reaction. The absorption and desorption reactions are continuously performed to remove $CO_2$ from the gaseous feed 412 and regenerate the alkaline capture solution.

As shown in FIG. 4, the first gas-liquid contactor 402 includes a first reactor vessel 444, a first solution inlet 434A, a first solution outlet 434B, a first gas inlet 432A, and a first gas outlet 432B; and the second gas-liquid contactor 406 includes a second reactor vessel 448, a second solution inlet 440A, a second solution outlet 440B, a second gas inlet 442A, and a second gas outlet 442B. The first and second gas-liquid contactors 402, 406 may include other features and components in some cases. As shown in FIG. 4, the components of the first and second gas-liquid contactors 402, 406 may be implemented, connected as the corresponding components of the first and second gas-liquid contactors 102/202/302, 106/206/306 in the example systems 100, 200, 300 shown in FIGS. 1-3; and may be operated as described in the operations of the example process 500 in FIG. 5 or in another manner.

As shown in FIG. 4, the example system 400 includes a condenser 476 configured to receive the second gas exhaust stream 424 from the second gas-liquid contactor 406 to separate $CO_2$ gas from water vapor or steam; and a reflux drum 478 configured to collect the condensed liquid reflux from the condenser 476 and to provide a reservoir for temporary storage before the condensed liquid is returned to the second gas-liquid contactor 406. In some instances, the condensed liquid reflux may be collected and used in another manner. For example, the condensed liquid reflux can be received at the reboiler heater 410 to generate steam for the second gas-liquid contactor 406. In some instances, a third gas exhaust stream 480 from the condenser 476 contains $CO_2$ with a concentration in a range of 91-100%.

As shown in FIG. 4, the example carbon dioxide removal system 400 further includes a first heat exchanger 462, a second heat exchanger 464, and a reboiler heater 410. In some instances, the $CO_2$-rich alkaline capture solution in the third solution stream 486, when transferred from the crystallization module 470 to the second gas-liquid contactor 406, can be heated by operation of the first and second heat exchanger 462, 464. Furthermore, during the desorption reaction in the second gas-liquid contactor 406, the $CO_2$-rich alkaline capture solution is also heated by operation of the reboiler heater 410. In some instances, the first and second heat exchangers 462, 464 and the reboiler heater 410 are configured such that the $CO_2$-rich alkaline capture solution in the second gas-liquid contactor 406 can have a temperature in a range of 0-140 degree Celsius. As shown in FIG. 4, the first heat exchanger 462 is configured to recycle at least a portion of the heat energy from the $CO_2$-lean alkaline capture solution; and allow heat transfer between a third solution stream 486 and a recirculation stream 428. The second heat exchanger 464 is configured to further recycle at least a portion of the heat energy from the geothermal fluid stream 472 (e.g., remaining heat in the brine at a temperature in a range of 80 to 135 degree Celsius) and allow heat transfer between the geothermal fluid stream 472 and the third solution stream 486. In some implementations, the reboiler heater 410 is configured to leverage a geothermal working fluid (e.g., brine) in a temperature range of 120-200 degree Celsius to provide heat energy to the desorption reaction needed in the second gas-liquid contactor 406. The heat energy is carried by steam in a second gaseous stream 482 received at the second gas-liquid contactor 406; and then transferred from the steam to the $CO_2$-rich alkaline capture solution when interacted with the $CO_2$-rich alkaline capture solution in the second gas-liquid contactor 406. In some instances, depending on the geothermal source, the first heat exchanger 462 may be optional. In some instances, the geothermal working fluid (e.g., brine) departing from the reboiler heater 410 or the second heat exchanger 464 may be returned to the geothermal site or used for absorption. In certain instances, the first heat exchanger 462, the second heat exchanger 464, and the reboiler heater 410 can be configured as the corresponding elements in the example system 200 shown in FIG. 2 or in another manner.

As shown in FIG. 4, the example carbon dioxide removal system 400 includes a crystallization module 470. The crystallization module 470 receives the $CO_2$-rich alkaline capture solution from the first gas-liquid contactor 402 in a first solution stream 426, the $CO_2$-lean alkaline capture solution from the second gas-liquid contactor 406 in a recirculation stream 428; and passes the $CO_2$-lean alkaline capture solution in a second solution stream 490 to the first gas-liquid contactor 402 and the $CO_2$-rich alkaline capture solution in a third solution stream 486 to the second gas-liquid contactor 406. In some implementations, the crystallization module 470 is configured to perform a crystallization reaction to increase the concentration of solid particles in the $CO_2$-rich alkaline capture solution passed into the second gas-liquid contactor 406 and reduce the concentration of solid particles in the $CO_2$-lean alkaline capture solution returned into the first gas-liquid contactor 402.

In some implementations, the crystallization module 470 includes a crystallization tank 492 and a hydro cyclone 494. In some instances, the crystallization module 470 may include other components. In some implementations, the $CO_2$-rich alkaline capture solution in the third solution stream 486 departing from the crystallization module 470 has a higher concentration of solid particles than that of the $CO_2$-rich alkaline capture solution in the first solution stream 426. In some implementations, the $CO_2$-lean alkaline capture solution in the second solution stream 490 has a lower concentration of solid particles than that of the $CO_2$-lean alkaline capture solution in the recirculation stream 428.

During operation, the temperature of the solution in the crystallization tank 492 is reduced, causing the solubility of the $CO_2$-rich complex and $CO_2$-lean complex dissolved in the solution to reduce, allowing a formation of CO2-rich complex precipitation and the CO2-rich complex precipitation to settle down at the bottom of the crystallization tank 492 for separation.

In some instances, during operation, a large amount of CO2-rich complex precipitation may be formed in the first gas-liquid contactor 402; and in this case, the $CO_2$-rich alkaline capture solution in the first solution stream 426 contains solid precipitates. The overall molar conversion of the $CO_2$-rich alkaline capture solution with precipitates (e.g., slurry) in the first solution stream 426 may reach about 40-95% or another value. As shown in FIG. 4, the first solution stream 426 is transferred into the crystallization tank 492 to separate $CO_2$ rich solid from less $CO_2$ rich liquid. The slurry passes through the second gas-liquid contactor 406, where $CO_2$ is removed, and the molar conversion of the slurry drops to about 0-90%. The $CO_2$-lean alkaline capture solution in the recirculation stream 428 can then be passed to the reboiler heater 410, the first heat exchanger 462, and then to the crystallization tank 492.

In some implementations, the hydro cyclone 494 is configured to filter a heterogenous solution stream (e.g., including solids and liquids) 484 from the crystallization tank 492 into two streams: a fourth solution stream 488 that contains mainly solid particles; and a fifth solution stream 490 that contains mainly liquid. In some implementations, the fourth solution stream 488 has a high amount of CO2-rich complex as the CO2-rich complex is less soluble in water than CO2-lean complex. The fourth solution stream 488 departing from the hydro cyclone 494 can be passed back to the second gas-liquid contactor 406 for the desorption reaction (e.g., merge with the solution from the crystallization tank 492 as part of the third solution stream 486); and the fifth solution stream 490 is passed back to the first gas-liquid contactor 402 to continuously being used for the absorption reaction during which more CO2-rich complex can be formed and precipitated out. The solution stream 490 departing from the hydro cyclone 494 may have a much lower molar conversion of around 0-25%, which can be passed back to the first gas-liquid contactor 402. At the same time, the fourth solution stream 488 having a molar conversion of about 40-95%, can be passed back to the desorption loop (e.g., back to the second gas-liquid contactor 406) for the desorption reaction.

Figure 5:
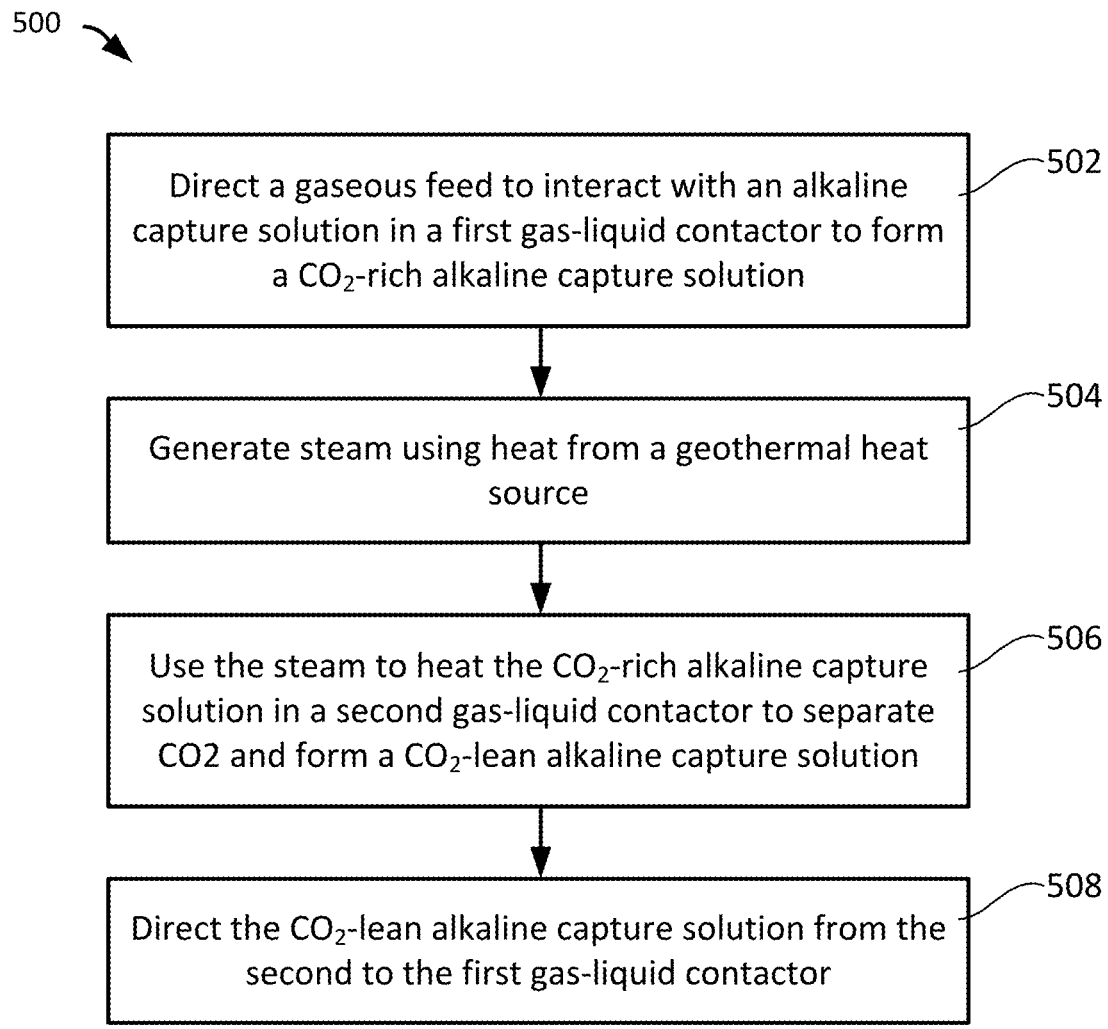
FIG. 5 is a flow chart showing aspects of an example carbon dioxide removal process.

FIG. 5 is a flow chart showing aspects of an example process 500 for removing $CO_2$ gas from a gaseous feed. The example process 500 can be used, for example, to operate a carbon dioxide removal system, e.g., the example carbon dioxide removal system 100, 200, 300, 400 in FIGS. 1-4. For instance, the example process 500 can be used to perform carbon dioxide removal directly from ambient air or flue gas generated from industrial point sources using two gas-liquid contactors. The example process 500 may include additional or different operations, including operations performed by additional or different components, and the operations may be performed in the order shown or in another order. In some implementations, one or more operations in the example process 500 can be performed by a computer system, for instance, by a digital computer system having one or more digital processors (e.g., data processing apparatus of the control system 156, 256, 356, 456 in FIGS. 1-4) that execute instructions (e.g., instructions stored in the memory unit of the control system 156, 256, 356, 456 in FIGS. 1-4).

At 502, a gaseous feed is directed to interact with an alkaline capture solution in a first gas-liquid contactor of a carbon dioxide removal system. The gaseous feed includes $CO_2$ gas. In some examples, the gaseous feed is drawn from ambient air; and the concentration of the $CO_2$ gas in the first gaseous feed is equal to or less than 1000 parts per million (ppm). In some instances, the gaseous feed may include a flue gas; and the gaseous feed may have other properties. In some examples, the first gas-liquid contactor includes an interfacial surface structure; and the gaseous feed is directed across the surfaces of the interfacial surface structure in the first gas-liquid contactor. Before and during the gaseous feed is directed into the first gas-liquid contactor, the first gas-liquid contactor may be wetted using the alkaline capture solution. In some instances, the alkaline capture solution descends along surfaces of the interfacial surface structure forming wet surfaces, e.g., driven by gravity. The gaseous feed flows across the surfaces of the interfacial surface structure in a crossflow fashion, in a counter flow fashion, or a hybrid flow fashion (e.g., crossflow and counter flow) during which the $CO_2$ gas in the gaseous feed can be react with and dissolved in the alkaline capture solution at the surfaces of the interfacial surface structure in the first gas-liquid contactor and a $CO_2$-rich alkaline capture solution can be formed.

In some instances, the first gas-liquid contactor can be, for example, the first gas-liquid contactors 102, 202, 302, 402 in FIGS. 1-4 or another type of gas-liquid contactor. The alkaline capture solution can be pumped by a pump and distributed by one or more liquid distributor residing at the top of the first gas-liquid contactor. In some implementations, the alkaline capture solution includes an aqueous ionic base, a phase transfer catalyst, an amine or a mixture of amines, and one or more carboxylic acid salts of amino acids.

In some implementations, the $CO_2$-rich alkaline capture solution has a concentration of $CO_2$ greater than that of the initial ($CO_2$-lean) alkaline capture solution. The concentration of the dissolved $CO_2$ in the $CO_2$-rich alkaline capture solution can be monitored. When the first gas-liquid contactor is implemented as the first gas-liquid contactor 102, 202, 302, 402 in FIGS. 1-4, in response to the concentration of the dissolved $CO_2$ in the $CO_2$-rich alkaline capture solution being less than a $CO_2$ concentration threshold value, the $CO_2$-rich alkaline capture solution can be circulated internally in the first gas-liquid contactor and continuously used for absorbing $CO_2$ gas in the gaseous feed. In response to the concentration of the dissolved $CO_2$ in the $CO_2$-rich alkaline capture solution being equal to or greater than the $CO_2$ concentration threshold value, the $CO_2$-rich alkaline capture solution can be transferred out of the first gas-liquid contactor into a desorption loop for a desorption reaction during which the dissolved $CO_2$ in the $CO_2$-rich alkaline capture solution can be removed and the alkaline capture solution can be regenerated.

At 504, steam is generated using heat from a geothermal heat source. In some instances, the steam is generated by operation of a steam generator powered at least in part by heat from a geothermal working fluid, or other geothermal heat source. In some instances, the steam generator may be implemented as a reboiler heater (e.g., the reboiler heater 210, 310, 410 as shown in FIGS. 2-4) or another type of boiler. In some implementations, the steam generator receives a flow of a geothermal working fluid from a geothermal site and a flow of an aqueous solution in a water supply stream, the thermal energy in the geothermal working fluid is transferred from the geothermal fluid stream to the water supply stream to generate steam. In some instances, the aqueous solution for steam generation may be obtained within the carbon dioxide removal system, e.g., from a recirculation stream containing a $CO_2$-lean alkaline capture solution from a second gas-liquid contactor (e.g., a desorption reactor), from a liquid reflux stream containing condensed water obtained from a gaseous exhaust stream of the second gas-liquid contactor, or in another manner.

In some implementations, the geothermal energy may be indirectly transferred between the geothermal working fluid (e.g., superheated water, brine, steam, etc.) and the aqueous solution in the water supply stream via a secondary working fluid. For example, the geothermal working fluid may be received by a heat pump (e.g., the heat pump 360 in the example system 300 shown in FIG. 3) and the heat pump fluid can be used to transfer the heat energy from the geothermal working fluid to the aqueous solution for steam generation. In some instances, the steam used as energy input to the desorption reaction in the second gas-liquid contactor and directly interact with the $CO_2$-rich alkaline capture solution may be generated in another manner.

At 506, the steam is directed into the second gas-liquid contactor. The $CO_2$-rich alkaline capture solution is passed from the first gas-liquid contactor to the second gas-liquid contactor for the desorption reaction. In some implementations, the flow of the steam directed into the second gas-liquid contactor interacts with the $CO_2$-rich alkaline capture solution causing the steam to heat up the $CO_2$-rich alkaline capture solution in the second gas-liquid contactor. The $CO_2$-rich alkaline capture solution is heated by the steam to a temperature sufficient to desorb at least a portion of the dissolved $CO_2$ gas and the liquid condensates. The at least a portion of the dissolved $CO_2$ can be released from the $CO_2$-rich alkaline capture solution and form a $CO_2$-lean alkaline capture solution. In some instances, the second gas-liquid contactor may include multiple trays or may operate as a packed bed to provide an easy vapor-liquid equilibrium and hence separation of the dissolved $CO_2$ gas from vapor/liquid condensate. After passing through the second gas-liquid contactor and a condenser for removing moisture, a $CO_2$ gas with a purity of 91-100% is collected. This $CO_2$ gas can then be compressed for geological sequestration or utilization in other applications.

In some implementations, when the $CO_2$-rich alkaline capture solution is passed from the first gas-liquid contactor to the second gas-liquid contactor for releasing the dissolved $CO_2$, the $CO_2$-rich alkaline capture solution can be warmed up. For example, the energy needed to warm up the $CO_2$-rich alkaline capture solution can be obtained by recycling at least a portion of the thermal energy from the $CO_2$-lean alkaline capture solution using a heat exchanger (e.g., the first heat exchanger 162, 262, 362, 462 in FIGS. 1-4), wherein the heat exchanger is configured to transfer heat from the $CO_2$-lean alkaline capture solution to the $CO_2$-rich alkaline capture solution. In some instances, the energy needed to warm up the $CO_2$-rich alkaline capture solution may be obtained in another manner. For example, the energy needed to warm up the $CO_2$-rich alkaline capture solution may be obtained by recycling thermal energy from a geothermal heat source (e.g., the geothermal working fluid in the geothermal fluid stream 272, 472 from the reboiler heater 210, 410 of the example system 200, 400 shown in FIGS. 2 and 4).

In some instances, when the concentration of the dissolved $CO_2$ in the $CO_2$-rich alkaline capture solution is equal to or greater than a threshold value, solid precipitates of the CO2-rich complex can be formed in the $CO_2$-rich alkaline capture solution. In this case, the $CO_2$-rich alkaline capture solution from the first gas-liquid contactor may include solid precipitates (e.g., particles containing CO2-rich complex). The concentration of the solid precipitates may be increased prior to passing the $CO_2$-rich alkaline capture solution to the second gas-liquid contactor. For example, a crystallization module (e.g., the crystallization module 470 in the example system 400 shown in FIG. 4) can be used to increase the content of the solid precipitates in the $CO_2$-rich alkaline capture solution. In some instances, a solution stream output from the crystallization module may be circulated back to the first gas-liquid contactor for the absorption reaction to dissolve $CO_2$ gas in the gaseous stream and form solid precipitates.

At 508, the $CO_2$-lean alkaline capture solution is directed from the second gas-liquid contactor to the first gas-liquid contactor. The $CO_2$-lean alkaline capture solution can be generated when the dissolved $CO_2$ is removed from the $CO_2$-rich alkaline capture solution, e.g., forming the $CO_2$-lean alkaline capture solution with a baseline or a negligible level of dissolved $CO_2$ concentration. The $CO_2$-lean alkaline capture solution is recirculated back to the gas-liquid contactor 102, 202, 302, 402 which can be reused for further $CO_2$ removal process.

In some instances, at least a portion of the thermal energy in the $CO_2$-lean alkaline capture solution can be recycled by passing the $CO_2$-lean alkaline capture solution in a heat exchanger to warm up the $CO_2$-rich alkaline capture solution in the desorption loop. In some instances, the $CO_2$-lean alkaline capture solution from the second gas-liquid contactor may include a small amount of solid precipitates. In this case, prior to receiving the $CO_2$-lean alkaline capture solution at the first gas-liquid contactor, the $CO_2$-lean alkaline capture solution may be passed through a crystallization module to reduce the content of the solid precipitates in the $CO_2$-lean alkaline capture solution. For example, the $CO_2$-lean alkaline capture solution in a recirculation stream (e.g., the stream 428) may be processed by a hydro cyclone (e.g., the hydro cyclone 494 in the crystallization module 470 as shown in FIG. 4) to form a first stream (e.g., the solution stream 488) with an increased content of solid precipitates and a second stream (e.g., the solution stream 490) with a reduced content of solid precipitates. In certain instances, the first stream can then be injected into the desorption loop (e.g., back to the second gas-liquid contactor for the desorption reaction); and the second stream may be circulated back to the first gas-liquid contactor for the absorption reaction to remove $CO_2$ from the gaseous feed.

FIGS. 6A-6E include block diagrams showing aspects of example carbon dioxide removal systems 600, 620, 640, 660, 680. In some implementations, the carbon dioxide removal systems 600, 620, 640, 660, 680 are assisted by geothermal energy in the form of heat from a geothermal heat source 606 and electricity generated by an energy conversion and storage system 604 and configured to perform a $CO_2$ capture and removal process by absorbing $CO_2$ gas from a gaseous feed (e.g., ambient air or flue gas) using an alkaline capture solution. At least a portion of the $CO_2$ gas in the gaseous feed can be removed in an upstream reactor 602A during an absorption reaction. The alkaline capture solution can be regenerated and recycled by removing at least a portion of the dissolved $CO_2$ in a downstream reactor 602B during a desorption reaction. In some instances, the example carbon dioxide systems 600, 620, 640, 660, 680 can provide improved energy efficiency by reducing the total energy input needed per a unit weight of removed $CO_2$ gas; and thus, can reduce the total cost of the $CO_2$ removal process. In some instances, the systems and methods presented here may provide other advantages over conventional carbon oxide removal processes.

Figure 6A:
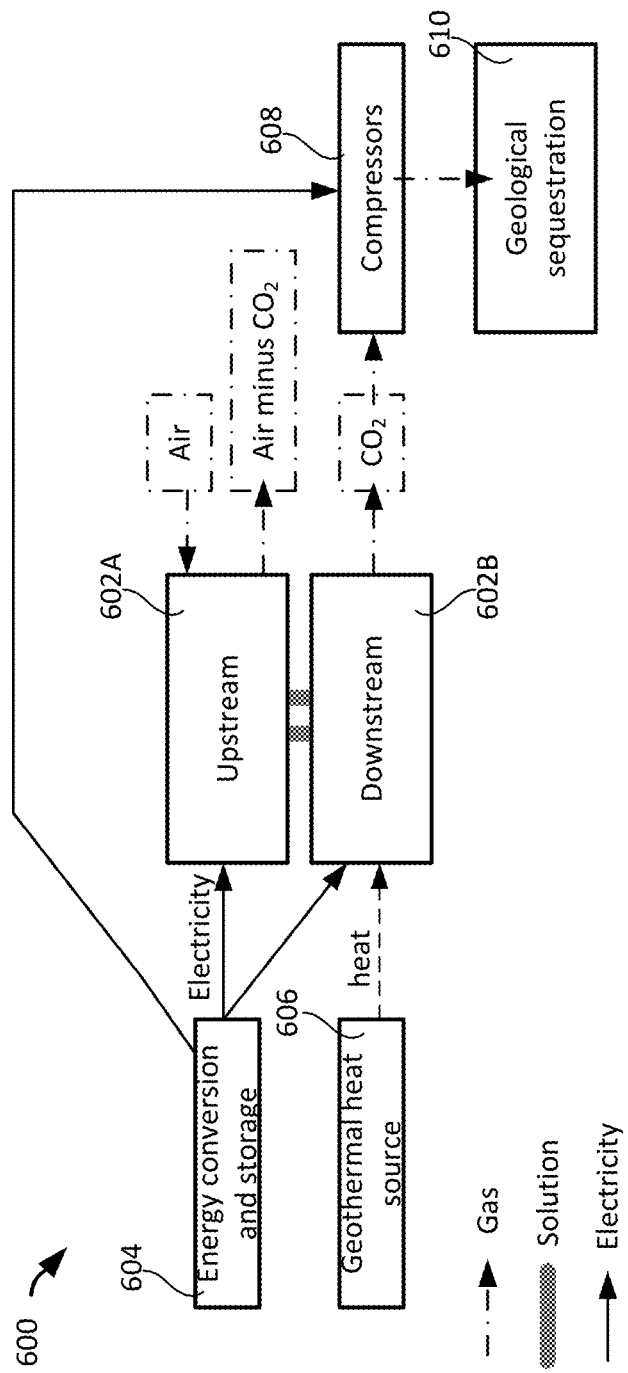
FIG. 6A-6E include block diagrams showing aspects of example carbon dioxide removal systems.

In some instances, the upstream reactor 602A of the example systems 600, 620, 640, 660, 680 in FIGS. 6A-6E may be implemented as the first gas-liquid contactor 102, 202, 302, 402 of the example system 100, 200, 300, 400 in FIGS. 1-4; and the downstream reactor 602B of the example systems 600, 620, 640, 660, 680 in FIGS. 6A-6E may be implemented as the second gas-liquid contactor 106, 206, 306, 406 of the example system 100, 200, 300, 400 shown in FIGS. 1-4. As shown in FIGS. 6A-6E, the downstream reactor 602B receives heat from the geothermal heat source 606 as energy input to the desorption reaction to separate the dissolved $CO_2$ from the $CO_2$-rich alkaline capture solution. As shown in FIG. 6A, components as part of the upstream and downstream reactors 602A, 602B can be powered by electricity from the energy conversion and storage system 604. In some implementations, the energy conversion and storage system 604 includes an energy conversion sub-system and an energy storage sub-system. In certain examples, the energy conversion sub-system may include solar panels, wind turbines, or other energy conversion devices that can convert other forms of energy (e.g., mechanical, solar, thermal, etc.) into electricity; and the energy storage sub-system may include Li-ion batteries, redox flow batteries, or other types of energy storage systems. In some instances, the example carbon dioxide removal system 600 may receive electricity directly from the grid. In certain examples, electricity can be used to power pumps, air movers, compressors, control systems, etc. Excess electricity generated by the energy conversion devices can be stored in the energy storage sub-system. The $CO_2$ separated in the downstream reactor 602B can be compressed by operation of a compressor 608; and stored in underground geologic formations in a geological sequestration process 610. In some instances, the $CO_2$ separated during the downstream reactor 602B may be used in other applications or processes.

As shown in FIGS. 6B-6E, geothermal energy in a form of heat can be carried by a stream 622A of a "hot" geothermal working fluid from a geothermal site, e.g., sedimentary aquifers. The hot geothermal working fluid as the geothermal heat source 606 can be pumped to the earth's surface via pumps 630. In some instances, the hot geothermal working fluid as the geothermal heat source 606 can flow to the surface due to naturally occurring pressure. A stream 622B of a "cold" geothermal working fluid can be returned to the geothermal site. In some implementations, the temperature of the hot geothermal working fluid in the stream 622A is greater than the temperature of the cold geothermal working fluid in the stream 622B. The heat from the geothermal working fluid can be used to sustain the desorption reaction in the downstream reactor 602B.

Figure 6B:
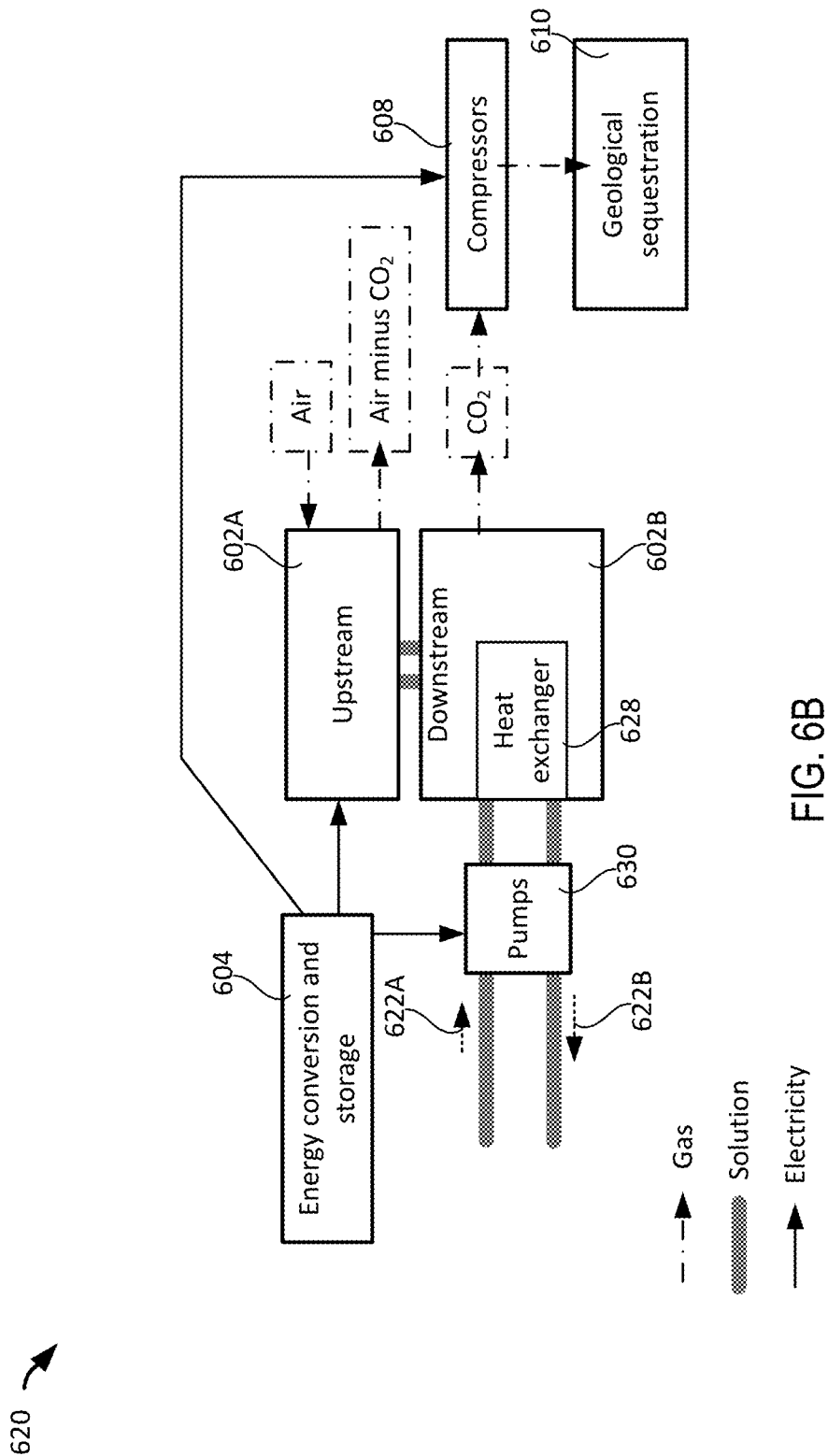

In some implementations, the hot geothermal working fluid can be directly used to heat up the $CO_2$-rich alkaline capture solution during the desorption reaction. For example, as shown in FIG. 6B, the hot geothermal working fluid and the $CO_2$-rich alkaline capture solution are passed through a heat exchanger 628. By operation of the heat exchanger 628, the heat can be transferred from the hot geothermal working fluid to the $CO_2$-rich alkaline capture solution in the downstream reactor 602B.

Figure 6C:
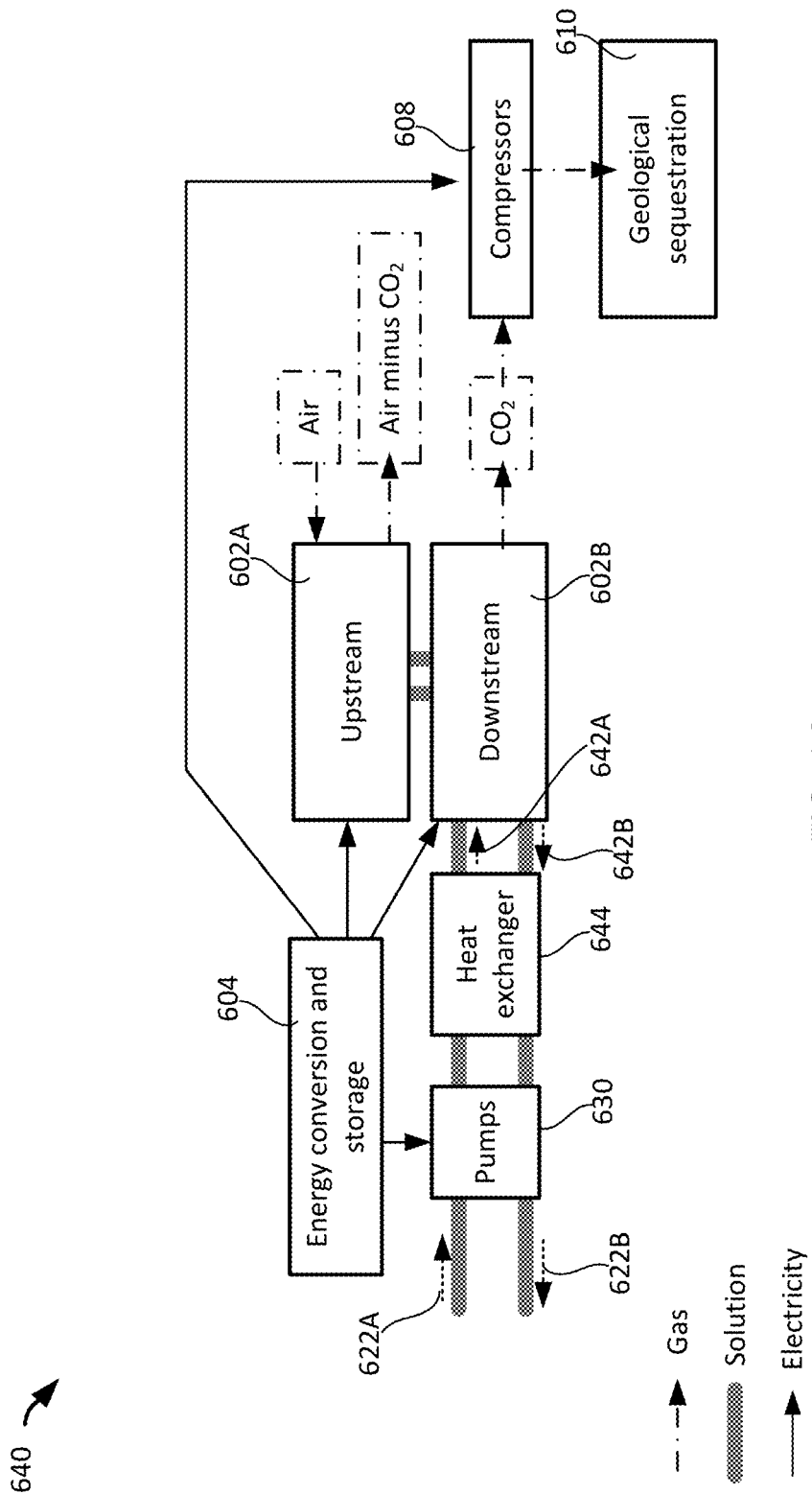
Figure 6D:
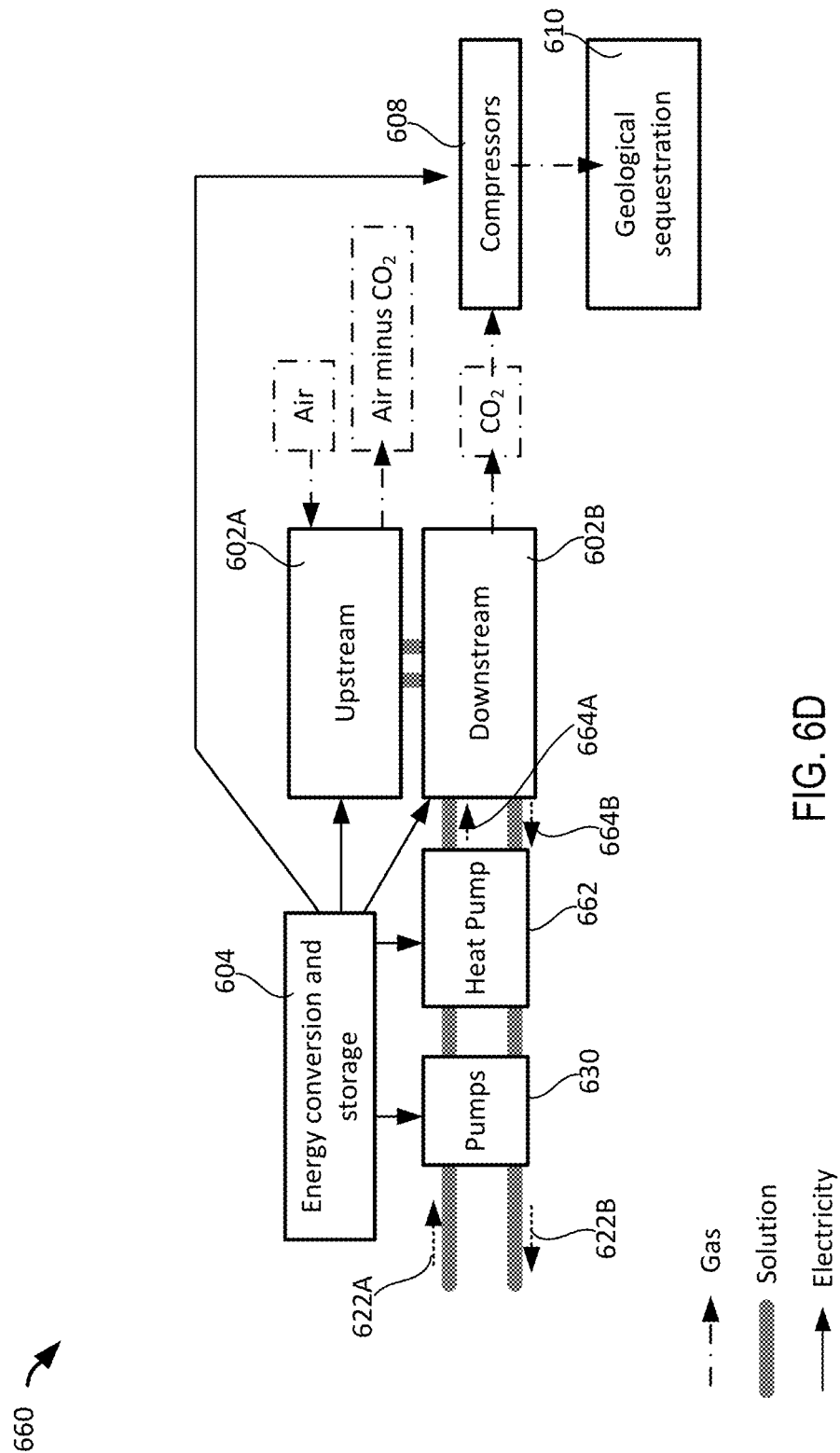

In some instances, the hot geothermal working fluid can be used to heat up a secondary working fluid; and the secondary working fluid can be used to heat up the $CO_2$-rich alkaline capture solution during the desorption reaction. For example, as shown in FIG. 6C, the hot geothermal working fluid in the stream 622A and a "cold" secondary working fluid in the stream 642B may be passed through a heat exchanger 644. By operation of the heat exchanger 644, the heat can be transferred from the hot geothermal working fluid to the secondary working fluid. The heat can be carried by a "hot" secondary working fluid in a stream 642A to the downstream reactor 602B to heat up the $CO_2$-rich alkaline capture solution to sustain the desorption reaction. In some instances, the heat exchanger 644 may be implemented as the steam generator 108 in the example system 100 shown in FIG. 1, the reboiler heater 210, 310, 410 in the example systems 200, 300, 400 shown in FIGS. 2-4, or in another manner. In some instances, the stream 642A contains steam; and the stream 642B contains the $CO_2$-lean alkaline capture solution. For another example, as shown in FIG. 6D, the hot geothermal working fluid in the stream 622A and a "cold" heat pump fluid in a stream 664B are passed through a heat pump 662. By operation of the heat pump 662 which is partially powered by the electricity from the energy conversion and storage system 604, the heat can be transferred from the hot geothermal working fluid in the stream 622A to the heat pump fluid in the stream 664B. The heat can be carried by a "hot" heat pump fluid in a stream 664A to the downstream reactor 602B to heat up the $CO_2$-rich alkaline capture solution for performing the desorption reaction. In some instances, the heat pump may be implemented as the heat pump 360 in the example system 300 shown in FIG. 3, or in another manner.

Figure 6E:
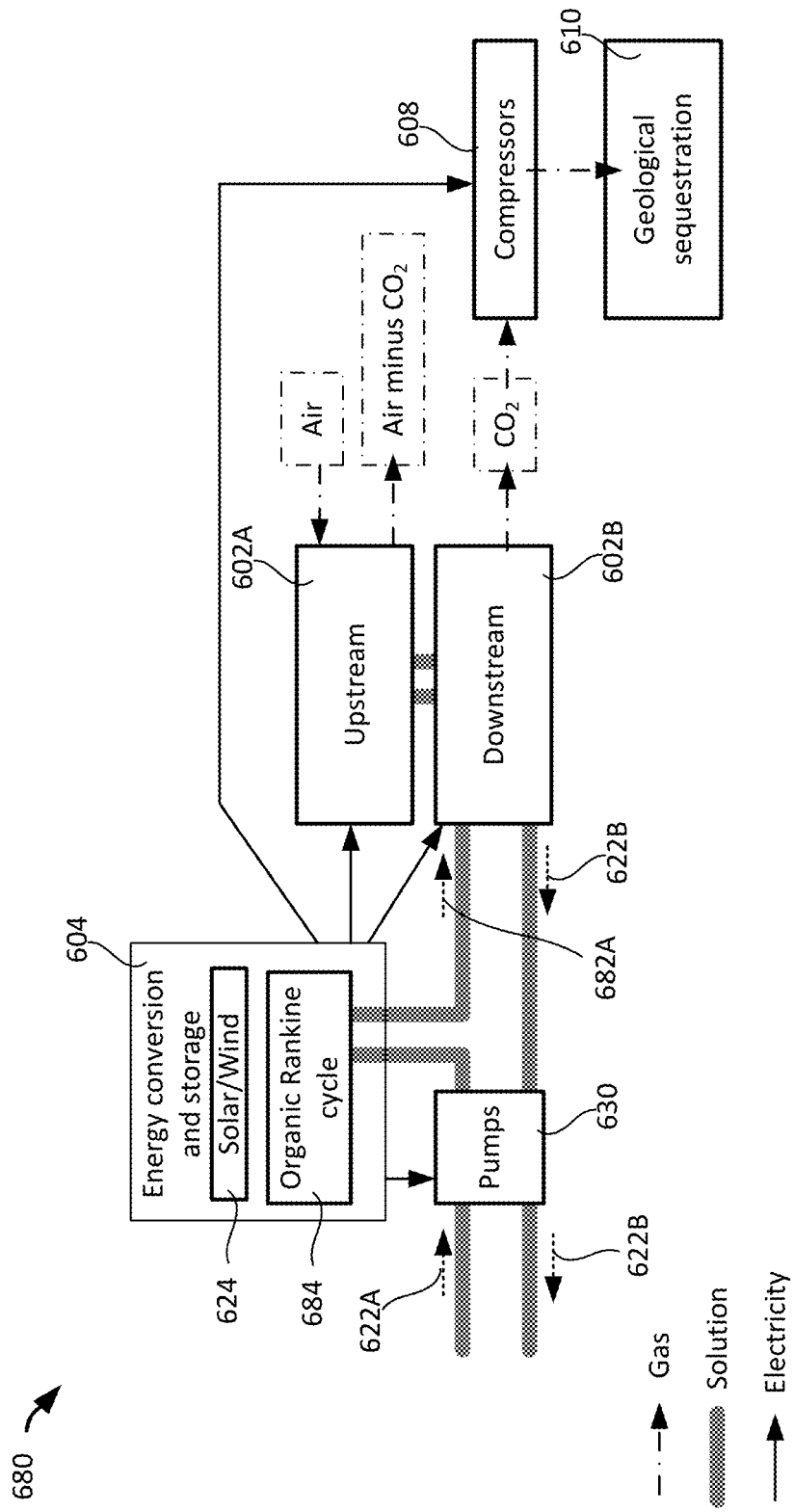

In some instances, the hot geothermal working fluid can be used to produce electricity prior to being used to heat up the $CO_2$-rich alkaline capture solution during the desorption reaction. For example, as shown in FIG. 6E, the energy conversion and storage system 604 includes an organic Rankine cycle (ORC) system 684. In some instances, the ORC system 684 may include an evaporator, a pump, an expander, a condenser, a regenerator, or other components. As shown in FIG. 6E, the hot geothermal working fluid in the stream 622A is passed through the ORC system 684. In some examples, the ORC system 684 may contain fluid that generally has a lower boiling temperature. The heat can be transferred from the hot geothermal working fluid to the fluid in the ORC system 684. The fluid after absorbing the heat from the hot geothermal working fluid can evaporate to drive a turbine to create electricity. The temperature of the geothermal working fluid in a stream 682A output from the ORC system 684 to the downstream reactor 602B is less than the temperature of the hot geothermal working fluid in the stream 622A. The remaining heat in the geothermal working fluid in the stream 682A can be transferred to the $CO_2$-rich alkaline capture solution to sustain the desorption reaction.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media.

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

In a general aspect, a carbon dioxide removal system is presented.

In a first example, a method to remove $CO_2$ gas from a gaseous feed includes directing a gaseous feed to interact with an alkaline capture solution in a first gas-liquid contactor, thereby causing a first portion of $CO_2$ from the gaseous feed to dissolve into the alkaline capture solution to form a $CO_2$-rich alkaline capture solution; generating steam using heat from a geothermal heat source; using the steam to heat the $CO_2$-rich alkaline capture solution in a second gas-liquid contactor to separate a second portion of the $CO_2$ from the $CO_2$-rich alkaline capture solution in the second gas-liquid contactor to form a $CO_2$-lean alkaline capture solution; and directing the $CO_2$-lean alkaline capture solution to the first gas-liquid contactor.

Implementations of the first example may include one or more of the following features. The geothermal heat source includes a geothermal working fluid, and generating steam using heat from a geothermal heat source includes passing the $CO_2$-lean alkaline capture solution from the second gas-liquid contactor to a reboiler heater; and passing the geothermal working fluid through the reboiler heater, wherein the reboiler heater transfers heat from the geothermal working fluid to the $CO_2$-lean alkaline capture solution to generate the steam. Directing the $CO_2$-lean alkaline capture solution to the first gas-liquid contactor includes passing the $CO_2$-lean alkaline capture solution to the first gas-liquid contactor from the reboiler heater. The method further includes passing the $CO_2$-lean alkaline capture solution from the reboiler heater through a heat exchanger; and passing the $CO_2$-rich alkaline capture solution from the first gas-liquid contactor through the heat exchanger. The heat exchanger transfers heat from the $CO_2$-lean alkaline capture solution to the $CO_2$-rich alkaline capture solution. The method further includes prior to passing the $CO_2$-rich alkaline capture solution from the first gas-liquid contactor through the heat exchanger and prior to directing the $CO_2$-lean alkaline capture solution to the first gas-liquid contactor, passing the $CO_2$-rich alkaline capture solution from the first gas-liquid contactor and the $CO_2$-lean alkaline capture solution from the reboiler heater through a crystallization drum; by operation of the crystallization drum, generating a first output stream comprising a slurry and a second output stream comprising a liquid; directing the first output stream to the second gas-liquid contactor; and directing the second output stream to the first gas-liquid contactor.

Implementations of the first example may include one or more of the following features. The method includes passing the geothermal working fluid from the reboiler heater through a heat exchanger; and passing the $CO_2$-rich alkaline capture solution from the first gas-liquid contactor through the heat exchanger. The heat exchanger transfers heat from the geothermal working fluid to the $CO_2$-rich alkaline capture solution. Using the steam to heat the $CO_2$-rich alkaline capture solution in the second gas-liquid contactor includes passing a gas exhaust stream from the second gas-liquid contactor through a condenser to remove water from the gas exhaust stream; collecting the water removed from the gas exhaust stream in a reflux drum; and passing the water from the reflux drum to the second gas-liquid contactor.

Implementations of the first example may include one or more of the following features. The geothermal heat source includes a geothermal working fluid. The geothermal working fluid includes a brine solution from a geothermal site. The geothermal heat source includes a geothermal fluid, and the method includes at a heat pump, receiving the geothermal working fluid at a first temperature; and by operation of the heat pump, heating a heat pump fluid to a second temperature using heat from the geothermal working fluid. The first temperature is less than the second temperature. The alkaline capture solution includes an aqueous ionic base, a phase transfer catalyst, an amine or a mixture of amines, and a carboxylic acid salt of an amino acid. The gaseous feed is directed to interact with the alkaline capture solution in the first gas-liquid contactor at a partial pressure of $CO_2$ in a range of $10^{-8}$ to $10^8$ psig.

In a second example, a carbon dioxide removal system for removing carbon dioxide from a gaseous feed includes a first gas-liquid contactor and a second gas-liquid contactor. The first gas-liquid contactor includes a first inlet that receives an alkaline capture solution; and a first flow path that receives the first gaseous feed and directs a flow of the gaseous feed to interact with an alkaline capture solution in the first gas-liquid contactor. Directing the gaseous feed to interact with the alkaline capture solution causes a first portion of $CO_2$ from the gaseous feed to dissolve into the alkaline capture solution and forms a $CO_2$-rich alkaline capture solution. The second gas-liquid contactor includes a second inlet that receives the $CO_2$-rich alkaline capture solution from the first gas-liquid contactor; a third inlet that receives steam generated from a geothermal heat source; and a vessel that separates a second portion of $CO_2$ from the $CO_2$-rich alkaline capture solution by heating the $CO_2$-rich alkaline capture solution using the steam and forms a $CO_2$-lean alkaline capture solution.

Implementations of the second example may include one or more of the following features. The geothermal heat source includes a geothermal working fluid, and the system includes a reboiler heater configured to receive the $CO_2$-lean alkaline capture solution from the second gas-liquid contactor; receive the geothermal working fluid; and transfers heat from the geothermal working fluid to the $CO_2$-lean alkaline capture solution to generate the steam. The first inlet is configured to receive the $CO_2$-lean alkaline capture solution from the reboiler heater. The system includes a heat exchanger configured to receive the $CO_2$-lean alkaline capture solution from the reboiler heater; receive the $CO_2$-rich alkaline capture solution from the first gas-liquid contactor; and transfer heat from the $CO_2$-lean alkaline capture solution to the $CO_2$-rich alkaline capture solution.

The system includes a heat exchanger configured to receive the geothermal working fluid from the reboiler heater; receive the $CO_2$-rich alkaline capture solution from the first gas-liquid contactor; and transfer heat from the geothermal working fluid to the $CO_2$-rich alkaline capture solution. The geothermal heat source includes a geothermal working fluid. The geothermal heat source includes a geothermal working fluid, and the system includes a heat pump configured to receive the geothermal working fluid at a first temperature; and heat a heat pump fluid to a second temperature using heat from the geothermal working fluid. The first temperature is less than the second temperature. The system includes a crystallization drum configured to receive the $CO_2$-rich alkaline capture solution from the first gas-liquid contactor and the $CO_2$-lean alkaline capture solution from the reboiler heater; generate a first output stream comprising a slurry and a second output stream comprising a liquid. The first inlet is configured to receive the second output stream from the crystallization drum, and the second let is configured to receive the first output stream from the crystallization drum.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple implementations separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method to remove carbon dioxide ($CO_2$) gas from a gaseous feed, the method comprising:
   directing a gaseous feed to interact with an alkaline capture solution in a first gas-liquid contactor, thereby causing a first portion of $CO_2$ from the gaseous feed to dissolve into the alkaline capture solution to form a $CO_2$-rich alkaline capture solution, the alkaline capture solution comprising:
   an aqueous ionic base,
   a phase transfer catalyst,
   an amine or a mixture of amines, and
   a carboxylic acid salt of an amino acid or a mixture of carboxylic acid salts of amino acids;
   generating steam using heat from a geothermal heat source;
   using the steam to heat the $CO_2$-rich alkaline capture solution in a second gas-liquid contactor, wherein a second portion of $CO_2$ is separated from the $CO_2$-rich alkaline capture solution in the second gas-liquid contactor to form a $CO_2$-lean alkaline capture solution; and
   directing the $CO_2$-lean alkaline capture solution to the first gas-liquid contactor.

2. The method of claim 1, wherein the geothermal heat source comprises a geothermal working fluid, and generating steam using heat from a geothermal heat source comprises:
   passing the $CO_2$-lean alkaline capture solution from the second gas-liquid contactor to a reboiler heater; and
   passing the geothermal working fluid through the reboiler heater, wherein the reboiler heater transfers heat from the geothermal working fluid to the $CO_2$-lean alkaline capture solution to generate the steam.

3. The method of claim 2, wherein directing the $CO_2$-lean alkaline capture solution to the first gas-liquid contactor comprises:
   passing the $CO_2$-lean alkaline capture solution to the first gas-liquid contactor from the reboiler heater.

4. The method of claim 3, comprising:
   passing the $CO_2$-lean alkaline capture solution from the reboiler heater through a heat exchanger; and
   passing the $CO_2$-rich alkaline capture solution from the first gas-liquid contactor through the heat exchanger, wherein the heat exchanger transfers heat from the $CO_2$-lean alkaline capture solution to the $CO_2$-rich alkaline capture solution.

5. The method of claim 4, comprising:
   prior to passing the $CO_2$-rich alkaline capture solution from the first gas-liquid contactor through the heat exchanger and prior to directing the $CO_2$-lean alkaline capture solution to the first gas-liquid contactor,
   passing the $CO_2$-rich alkaline capture solution from the first gas-liquid contactor and the $CO_2$-lean alkaline capture solution from the reboiler heater through a crystallization drum;
   by operation of the crystallization drum, generating a first output stream comprising a slurry and a second output stream comprising a liquid;
   directing the first output stream to the second gas-liquid contactor; and
   directing the second output stream to the first gas-liquid contactor.

6. The method of claim 2, comprising:
   at a heat pump, receiving the geothermal working fluid at a first temperature; and
   by operation of the heat pump, heating a heat pump fluid to a second temperature using heat from the geothermal working fluid, wherein the first temperature is less than the second temperature.

7. The method of claim 2, comprising:
   passing the geothermal working fluid from the reboiler heater through a heat exchanger; and
   passing the $CO_2$-rich alkaline capture solution from the first gas-liquid contactor through the heat exchanger, wherein the heat exchanger transfers heat from the geothermal working fluid to the $CO_2$-rich alkaline capture solution.

8. The method of claim 1, comprising:
   passing a gas exhaust stream from the second gas-liquid contactor through a condenser to remove water from the gas exhaust stream;
   collecting the water removed from the gas exhaust stream in a reflux drum; and
   passing the water from the reflux drum to the second gas-liquid contactor.

9. The method of claim 1, wherein the geothermal heat source comprises a geothermal working fluid.

10. The method of claim 9, wherein the geothermal working fluid comprises a brine solution.

11. The method of claim 1, wherein the gaseous feed is directed to interact with the alkaline capture solution in the first gas-liquid contactor at a partial pressure of $CO_2$ in a range of $10^{-8}$ to $10^8$ psig.

12. The method of claim 1, wherein the geothermal heat source comprises a geothermal working fluid from a sedimentary geothermal resource.

\* \* \* \* \*